(12) United States Patent
Kumada

(10) Patent No.: US 6,377,355 B1
(45) Date of Patent: Apr. 23, 2002

(54) COLOR GAMUT DISPLAYING METHOD, AN IMAGE PROCESSING METHOD, AND APPARATUS UTILIZING THESE METHODS

(75) Inventor: Shuichi Kumada, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/522,110

(22) Filed: Mar. 9, 2000

Related U.S. Application Data

(62) Division of application No. 08/378,747, filed on Jan. 26, 1995.

(30) Foreign Application Priority Data

Jan. 31, 1994 (JP) .............................................. 6-010023

(51) Int. Cl.⁷ .............................................. B41B 15/00
(52) U.S. Cl. ..................................... 358/1.12; 358/525
(58) Field of Search ................................ 358/500, 501, 358/504, 518, 519, 520, 521, 523–525, 515, 1.9, 1.12

(56) References Cited

U.S. PATENT DOCUMENTS

| | | | |
|---|---|---|---|
| 4,500,919 A | 2/1985 | Shreiber | 358/518 |
| 5,058,040 A | 10/1991 | Tajima | 364/521 |
| 5,157,483 A | 10/1992 | Shoji et al. | 358/518 |
| 5,185,661 A | 2/1993 | Ng | 358/505 |
| 5,299,291 A | 3/1994 | Ruetz | 358/518 |
| 5,390,035 A | 2/1995 | Kasson et al. | 358/518 |
| 5,933,252 A | 8/1999 | Emori et al. | 358/500 |

FOREIGN PATENT DOCUMENTS

| | | |
|---|---|---|
| EP | 0 142 975 | 5/1985 |
| EP | 0 187 534 | 7/1986 |
| EP | 0 448 250 | 9/1991 |
| EP | 0 486 311 | 5/1992 |
| EP | 0 546 773 | 6/1993 |
| EP | 0 555 866 | 8/1993 |
| EP | 0 574 905 | 12/1993 |
| GB | 2 201 562 | 9/1988 |

OTHER PUBLICATIONS

J. Taylor, et al., "Device–Independent Color Matching You Can Buy Now," Information Display 4 & 5, pp. 20–22 and 49, (1991).

*Primary Examiner*—Kimberly A. Williams
(74) *Attorney, Agent, or Firm*—Fitzpatrick, Cella, Harper & Scinto

(57) ABSTRACT

The host computer 2 defines a color gamut as a solid of a three dimensional space to represent a color reproduction area of a color reproduction device, and instructs to display the color gamut in accordance with combinations of information on the color reproduction area on the basis of second and third axes extending to both the positive and negative directions in a plane perpendicular to a first axis of the defined three dimensional space and coordinates of the first axis. For example, the information on the color reproduction area in the plane perpendicular to the first axis can be represented by a two dimensional area, a two dimensional coordinate area, bit map data, or two dimensional vector data, thereby the color gamut for realizing a color gamut checking function is easily confirmed.

20 Claims, 27 Drawing Sheets

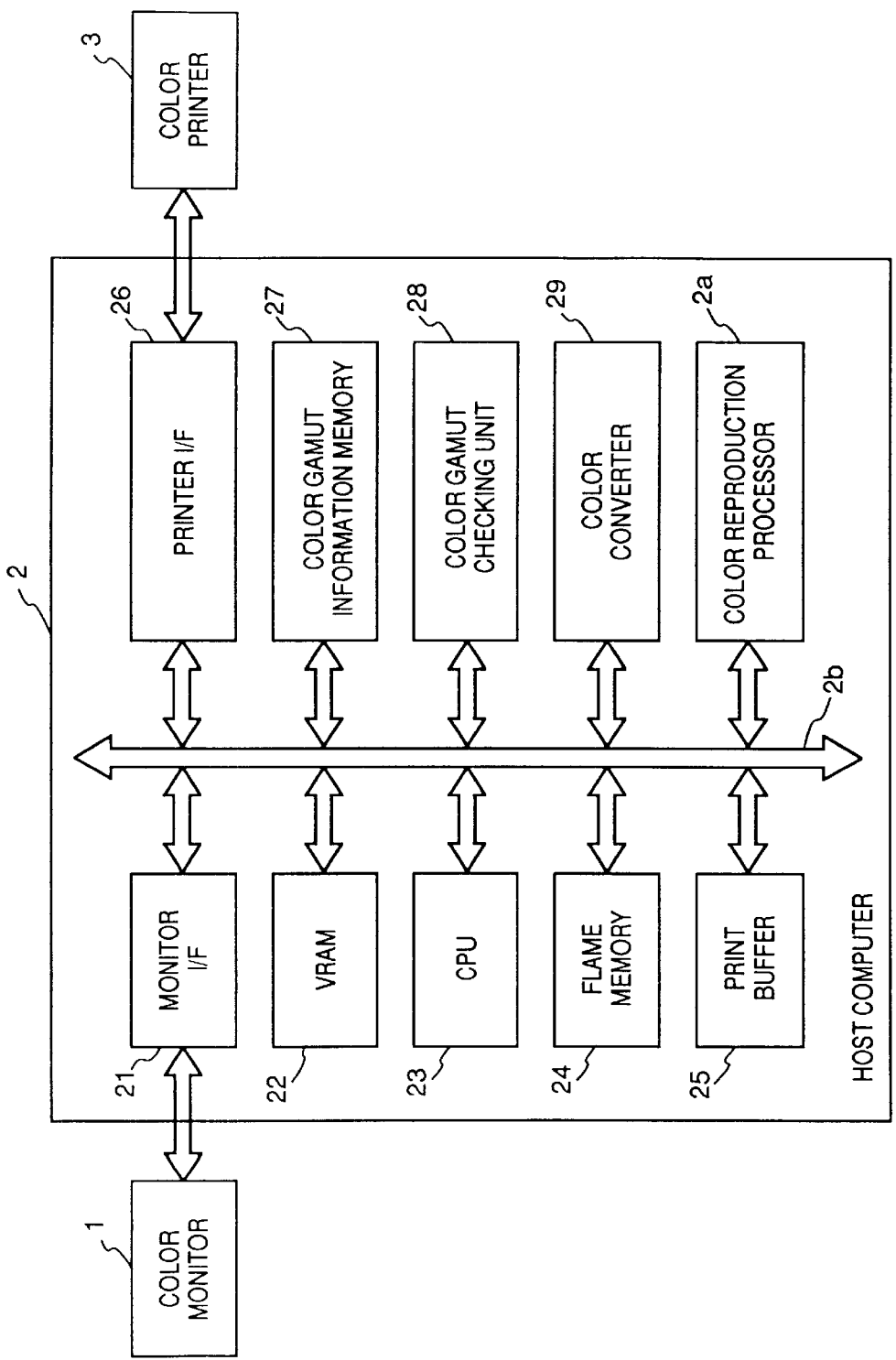

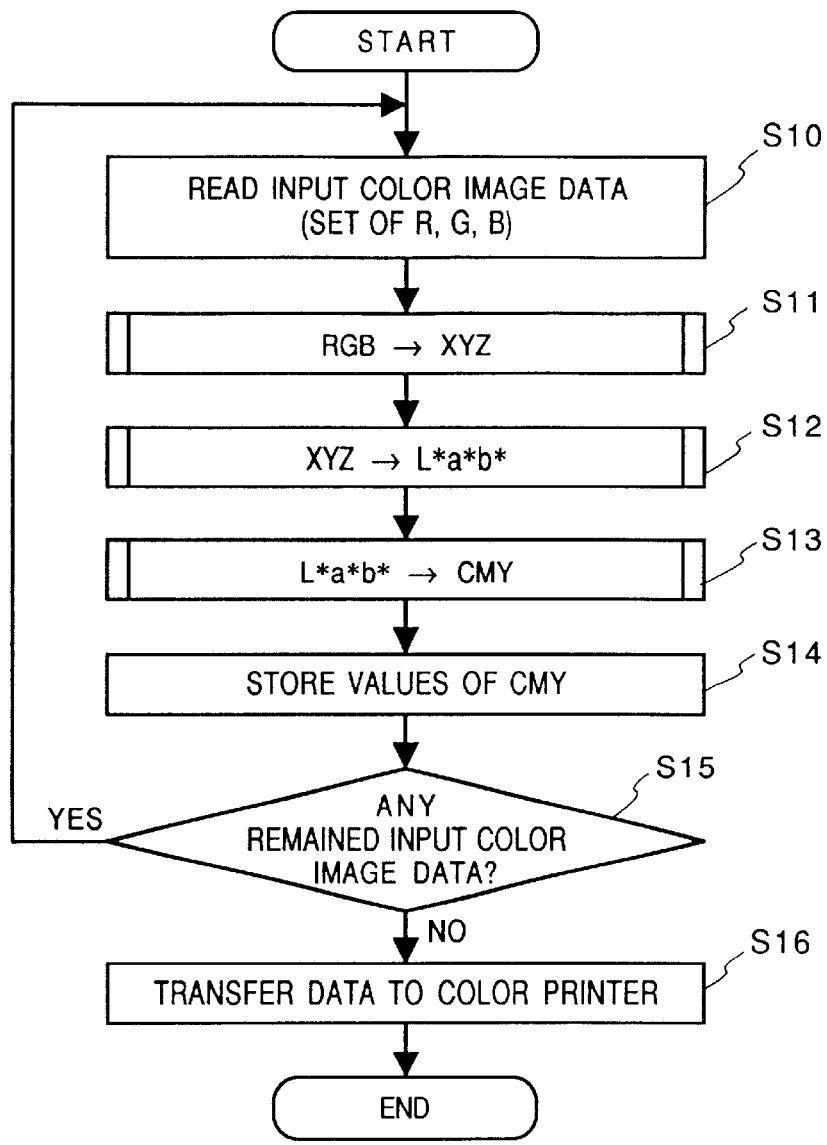

FIG. 4

$$\begin{pmatrix} R \\ G \\ B \end{pmatrix} = \begin{pmatrix} Q_{11} & Q_{12} & Q_{13} \\ Q_{21} & Q_{22} & Q_{23} \\ Q_{31} & Q_{32} & Q_{33} \end{pmatrix} \begin{pmatrix} X \\ Y \\ Z \end{pmatrix}$$

FIG. 5

$$\begin{cases} L^* = \begin{cases} 116\,(Y/Y_n)^{\frac{1}{3}} - 16 & (Y/Y_n > 0.008856) \\ 903.3\,(Y/Y_n) & (Y/Y_n < 0.008856) \end{cases} \\[2em] a^* = \begin{cases} 500\,[(X/X_n)^{\frac{1}{3}} - (Y/Y_n)^{\frac{1}{3}}] & \begin{pmatrix} X/X_n > 0.008856 \\ Y/Y_n > 0.008856 \end{pmatrix} \\ 500\,[f(X/X_n) - f(Y/Y_n)] & \begin{pmatrix} X/X_n < 0.008856 \\ Y/Y_n < 0.008856 \end{pmatrix} \end{cases} \\[2em] b^* = \begin{cases} 200\,[(Y/Y_n)^{\frac{1}{3}} - (Z/Z_n)^{\frac{1}{3}}] & (Z/Z_n > 0.008856) \\ 200\,[f(Y/Y_n) - f(Z/Z_n)] & (Z/Z_n < 0.008856) \end{cases} \\[2em] \qquad f(X/X_n) = 7.787\,(X/X_n) + 16/116 \\ \qquad f(Y/Y_n) = 7.787\,(Y/Y_n) + 16/116 \\ \qquad f(Z/Z_n) = 7.787\,(Z/Z_n) + 16/116 \end{cases}$$

FIG. 17

| | | | | | | | |
|---|---|---|---|---|---|---|---|
| b*min → i1 | a11min | b11max | a12min | b12max | - - - | a1i1min | b1i1max |
| i2 | a21min | b21max | a22min | b22max | - - - | a2i2min | b2i2max |
| ⋮ | | | | | | | |
| b*max in | an1min | bn1max | an2min | bn2max | - - - | aninmin | bninmax |

FIG. 18

| 2 | -1 | 0 | 1 | 2 |
|---|---|---|---|---|
| 1 | -2 | 3 | | |
| 1 | -2 | 3 | | |
| 1 | -1 | 3 | | |
| 1 | -1 | 1 | | |

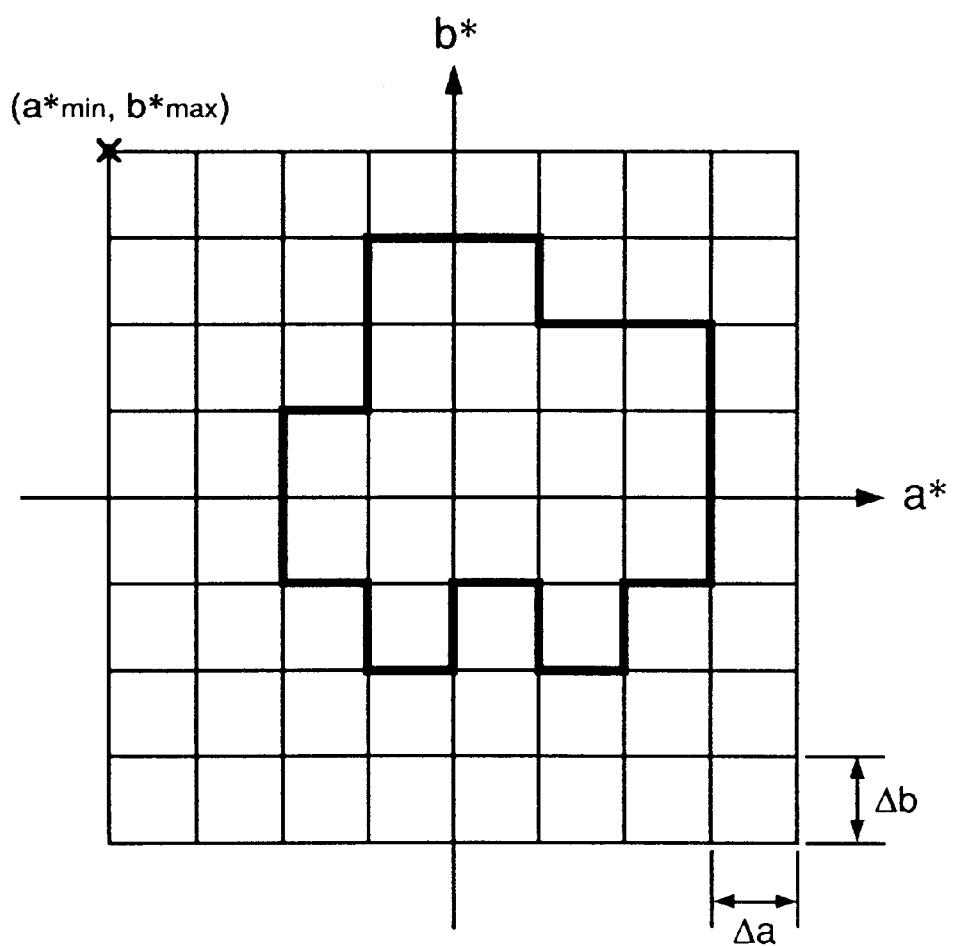
F I G. 22

COLOR GAMUT DISPLAYING METHOD, AN IMAGE PROCESSING METHOD, AND APPARATUS UTILIZING THESE METHODS

This is a divisional of parent application Ser. No. 08/378,747, filed Jan. 26, 1995.

BACKGROUND OF THE INVENTION

The present invention relates to a color gamut displaying method, an image processing method, and an apparatus capable of utilizing the methods, which are suitable for a color management system, and the like, for instance, reproducing colors faithfully in consideration with characteristics of a color input/output device.

As shown in FIG. 32, color ranges which can be reproduced by devices, such as a scanner, a monitor, and a printer, are different each other.

In FIG. 32, x and y denotes axes for chromaticity, and insides of closed areas are color gamuts. In other words, the key to reproduce colors after considering the difference in a color gamut is how to deal with portions of ranges which are not common to different devices. For example, when transformation from a monitor color space to a printer color space is considered, a major problem is that which color should be used to express a color outside of a color gamut of a printer. A process to deal with the above-said problem is called a color gamut compression process.

A color management system has major functions, such as a function of performing the color gamut compression process for faithfully reproducing colors in consideration with characteristics of a color input/output device, as well as a color gamut checking function for checking whether or not it is possible to reproduce a color by an output device. The latter function is used to determine whether or not color data, included in an application software and the like, can be reproduced by an output device (e.g., printer monitor).

Specifically, a method which is shown in FIG. 34 is suggested by the present inventor.

According to the method, a color gamut of a printer is defined by a color reproduction solid whose shape is a hexahedron, determined by peaks of red, green, blue, cyan, magenta, yellow, white, and black. Then each surface of the hexahedron is divided into two triangles to obtain total of twelve areas. Finally, image data is determined whether it is inside or outside of the areas, thereby it is determined if the image data is in the color gamut or not.

However, there are problems to be solved in the aforesaid method.

(1) A real color gamut of a printer has a three dimensional solid which is too complicated to express with a hexahedron, thus the precision of checking the color gamut is low.

(2) It is not a simple process to determine whether or not image data is inside of the twelve areas, thus it requires a long time to complete the process.

SUMMARY OF THE INVENTION

The present invention has been made in consideration of the above situation, and has as its object to provide a color gamut expression method for realizing a color gamut checking function which improves the precision of checking and shortens a processing time in a color management system and the like.

Further, another object of the present invention is to provide an image processing method and an apparatus utilizing the method, capable of converting input image data into image data which enables to reproduce inputted image data more faithfully by a color reproduction device.

Especially, it is an object to provide an image processing method and apparatus which are most suitable for a checking function which checks input image data and a color gamut of a printer, and which reproduce colors designated by the input image data more faithfully.

The foregoing object is attained by providing an apparatus, where the color gamut is defined by a solid in a three dimensional space, comprising color gamut expression means for expressing defined color gamut by combinations of color gamut data on the basis of a second and a third axes extending to both the positive and negative directions on a plane perpendicular to a first axis of the three dimensional space and coordinates of the first axis.

Further, the foregoing object is attained by providing an apparatus comprising processing means which defines a color gamut by a solid in a three dimensional space, and determines the color gamut of the color reproduction device by combinations of color gamut data on the basis of second and third axes extending to both the positive and negative directions on a plane perpendicular to a first axis of the three dimensional space and coordinates of the first axis, and processes an input color image data depending upon whether or not the input color image data is within the determined color gamut.

Furthermore, the foregoing object is attained by providing an apparatus comprising storage means for storing information on a defined color gamut expressed by combinations of color gamut data on the basis of second and third axes extending to both the positive and negative directions on a plane perpendicular to a first axis of a three dimensional space where a color gamut of a color reproduction device is defined as a solid and coordinates of the first axis, determination means for determining whether or not input image data is within the defined color gamut on the basis of the information stored in the storage means, and image processing means for processing the input image data on the basis of the result of determination means.

According to a constitution as described above, there can be provided an image processing method capable of converting input image data into image data which enables to reproduce inputted image data more faithfully by a color reproduction device.

Further, the color gamut for realizing the color gamut checking function is easily confirmed, the precision of determining the color gamut can be improved, as well as the time to process the color reproduction can be shortened.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing a configuration of an image processing system according to an embodiment of the present invention;

FIG. 2 is a flowchart showing a process to output an image by a color printer after applying color reproduction process to input color image data according to the embodiment;

FIG. 3 is an equation in matrix notation, showing relationship between XYZ data, defined by CIE, and RGB data according to the embodiment;

FIG. 4 is an equation in matrix notation, showing relationship between the RGB data, defined by CIE, and XYZ data according to the embodiment;

FIG. 5 explains an example of converting the XYZ data, defined by the CIE, into L* a* b* according to the embodiment;

FIG. 17 is an example of a color gamut data table in a case where the gamut of a monitor or a printer is defined in two dimensional coordinate range according to the second embodiment;

FIG. 18 is a color gamut data table in a case where Δa=Δb=1 in FIG. 15 according to the second embodiment;

FIG. 22 is an example of a case where a gamut of a monitor or a printer is defined by bit map in the two dimensional area of a* and b*, constructed with rectangular lattices, which is obtained by slicing the three dimensional color solid in the direction perpendicular to the L* axis according to a third embodiment;

DETAILED DESCRIPTION OF THE PREFERRED EMBODIMENTS

Preferred embodiments of the present invention will be described in detail in accordance with the accompanying drawings.

Figure 31:
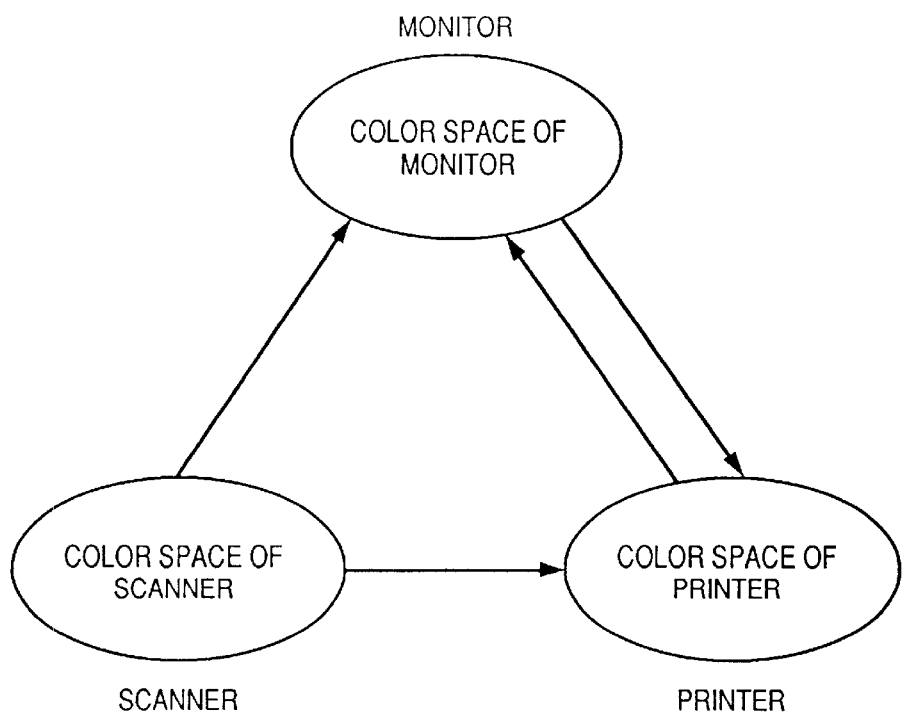
FIG. 31 is an example of color reproduction by a color management system.
Figure 32:
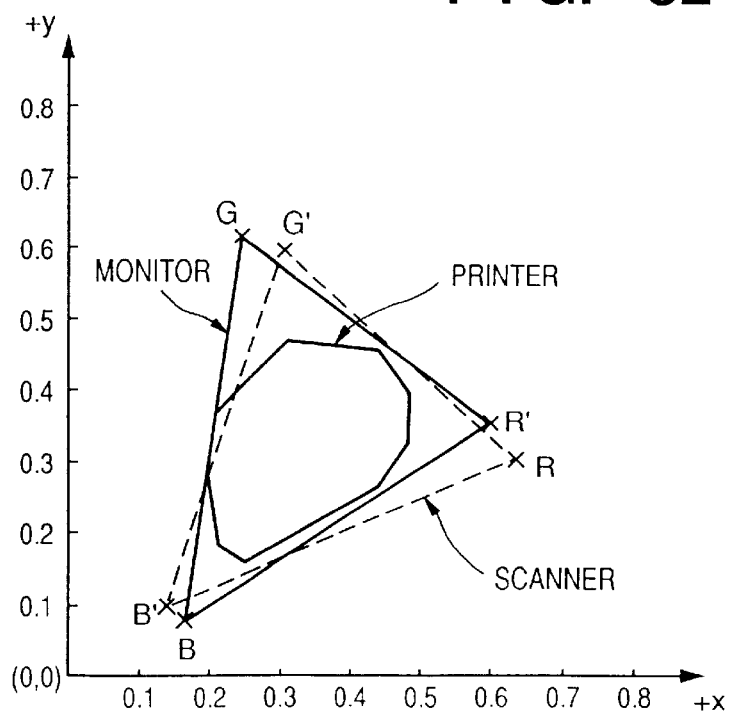
FIG. 32 is an example showing differences in color gamut among devices.

FIG. 31 shows an example of color reproduction by a color management system. As a color input/output device in FIG. 31, a basic color scanner, color monitor, and color printer are considered.

In the color management system, a color reproduction process is performed in consideration with characteristics of those three devices. The process is composed of following four color space conversion processes, shown by arrows in FIG. 31.

1. Conversion from a color space of the scanner to a color space of the monitor;

A process to display data of a photograph read by the scanner onto the monitor faithfully.

2. Conversion from a color space of the scanner to a color space of the printer;

A process to print data of a photograph read by the scanner by the printer faithfully.

3. Conversion from a color space of the monitor to a color space of the printer;

A process to print data, such as character and figure data, generated on the monitor by using an application software or the like, by a printer faithfully.

4. Conversion from a color space of the printer to a color space of the monitor;

A process to preview an image to be printed by a printer on the monitor.

Note that the aforesaid color spaces rely on the three devices, and the color gamuts differ from each other.

Following is an example of a conversion process from the color space of the monitor to the color space of the printer, as described above in 3.

FIG. 1 is a block diagram showing a circuit configuration of an image processing system according to an embodiment of the present invention.

As shown in FIG. 1, the image processing system of the present embodiment comprises a color monitor 1, host computer 2, and color printer 3. The host computer 2 process image data, instructs the color monitor 1 to display the processed result and also instructs the color printer 3 to print.

The host computer 2 comprises a monitor interface 21 for interchanging data with the color monitor 1; VRAM 22 for maintaining display data used for monitor display; CPU 23 including ROM, RAM, and the like, for controlling the entire system; a frame memory 24 used for temporary storing image information to be displayed on the monitor; a print buffer 25 used for printer output; a printer interface 26 for interchanging data with the color printer 3; a color gamut information memory 27 for storing information for displaying a color gamut, such as a color gamut data table; a color gamut checking unit 28 for determining whether or not input color image data is in the color gamut; color converter 29 for converting color spaces relating color reproduction; and color reproduction processor 2a for reproducing color on the basis of the determined result by the color gamut checking unit 28.

A process to apply a color reproduction to input color image data and to output the processed image to the color printer 3 by the host computer 2 having aforesaid constitution, more specifically by the color reproduction processor 2a, is described below with reference to a flowchart in FIG. 2.

In FIG. 2, the host computer 2 reads a set of input color image data to be processed (luminance data of R, G, B) which is generated at step S10 in advance or sent from another device, such as the scanner, then the process moves to step S11. Note that the input color image data to be processed in the present embodiment depends on an input device, such as a scanner, and the data is RGB data defined based on colorimetry (values of chromaticity of R, G, B, and white are definite).

The read RGB data is converted into data in DIE 1931 standard colorimetric system (indicated as "XYZ data", hereinafter) which is defined by CIE (Commission Internationale de l'Eclairage) by a color converter 29 at step S11, the process proceeds to step S12. At step S12, the XYZ data, converted by the color converter 29 at step S1, is further converted into L*a*b* data, then the process goes to step S13. At step S13, the L*a*b* data is converted into CMY (cyan, magenta, yellow) data for a printer, and the process moves to step S14.

At step S14, the CMY data is stored in the print buffer 25, then the process proceeds to step S15. At step S15, whether or not there is any remaining input color image data is checked. If there is, the process goes back to step S10.

If there is not, the process moves to step S16, and the CMY data, stored in the print buffer 25, is sent to the color printer 3 via the printer I/F 26. After an image is printed out by the color printer 3, the process is completed.

As described above, the input color image data to be processed in the embodiment is the RGB data defined based on colorimetry (values of chromaticity of R, G, B, and white are definite), thus equations shown in FIGS. 3 and 4 show the relationship between RGB data and XYZ data which is defined by the CIE. Therefore, the equations in FIGS. 3 and 4 can be used in a process at step S11 in FIG. 2. $P_{ij}$(i, j=1, 2, 3) in FIG. 3 and $Q_{ij}$(i, j, =1, 2, 3) in FIG. 4 are constants defined based on colorimetry of input color image data.

FIG. 5 is an example of a process at step S12 in FIG. 2. Xn, Yn, and Zn in FIG. 5 are determined depending upon a kind of used CIE standard light source.

Step S13 in FIG. 2 is a conversion process, including color gamut compression, to convert the L*a*b* data including colors beyond the color gamut of a printer to the CMY data which is within the color gamut of the printer.

There are several methods of color gamut compression.

Figures 33A, 33B:
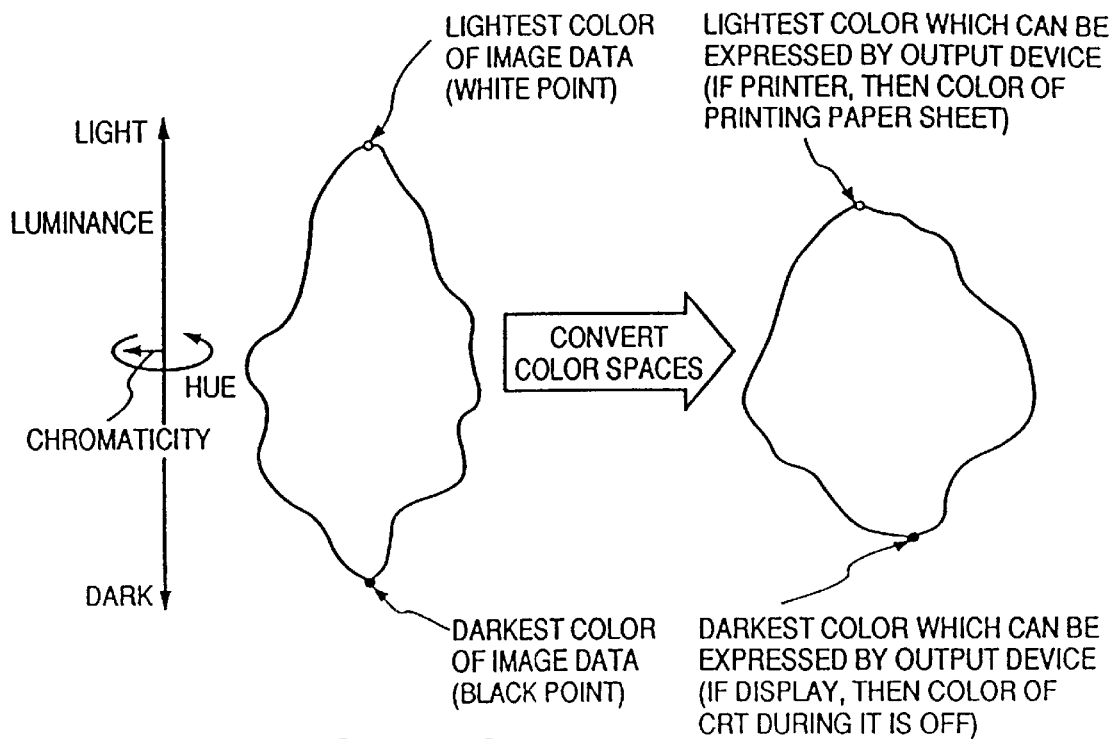
FIG. 33, composed of FIGS. 33A–33E, shows an example of a color gamut compression.
Figures 33C, 33D, 33E:
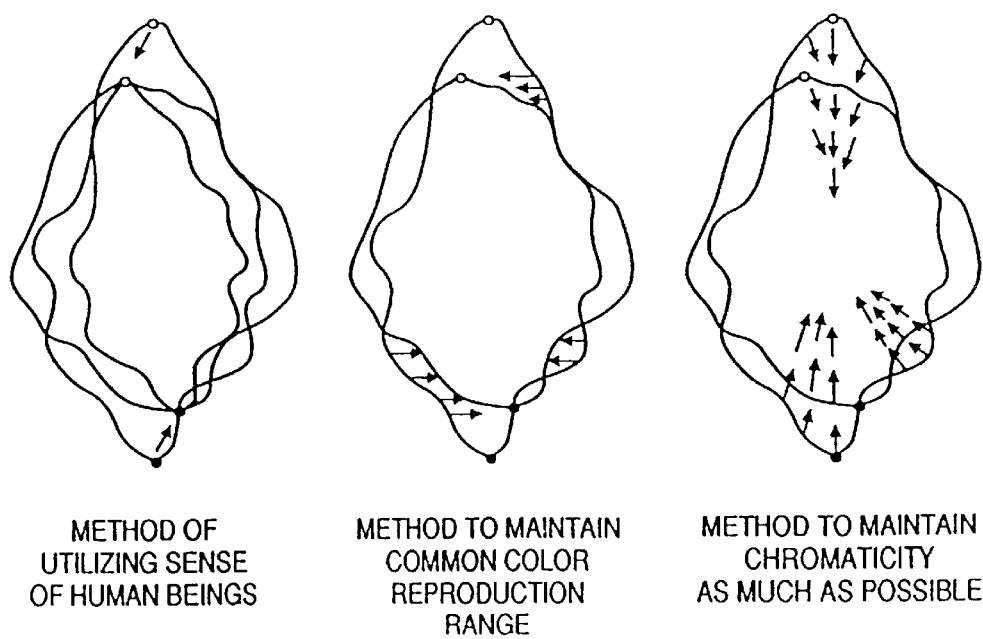
Figure 34:
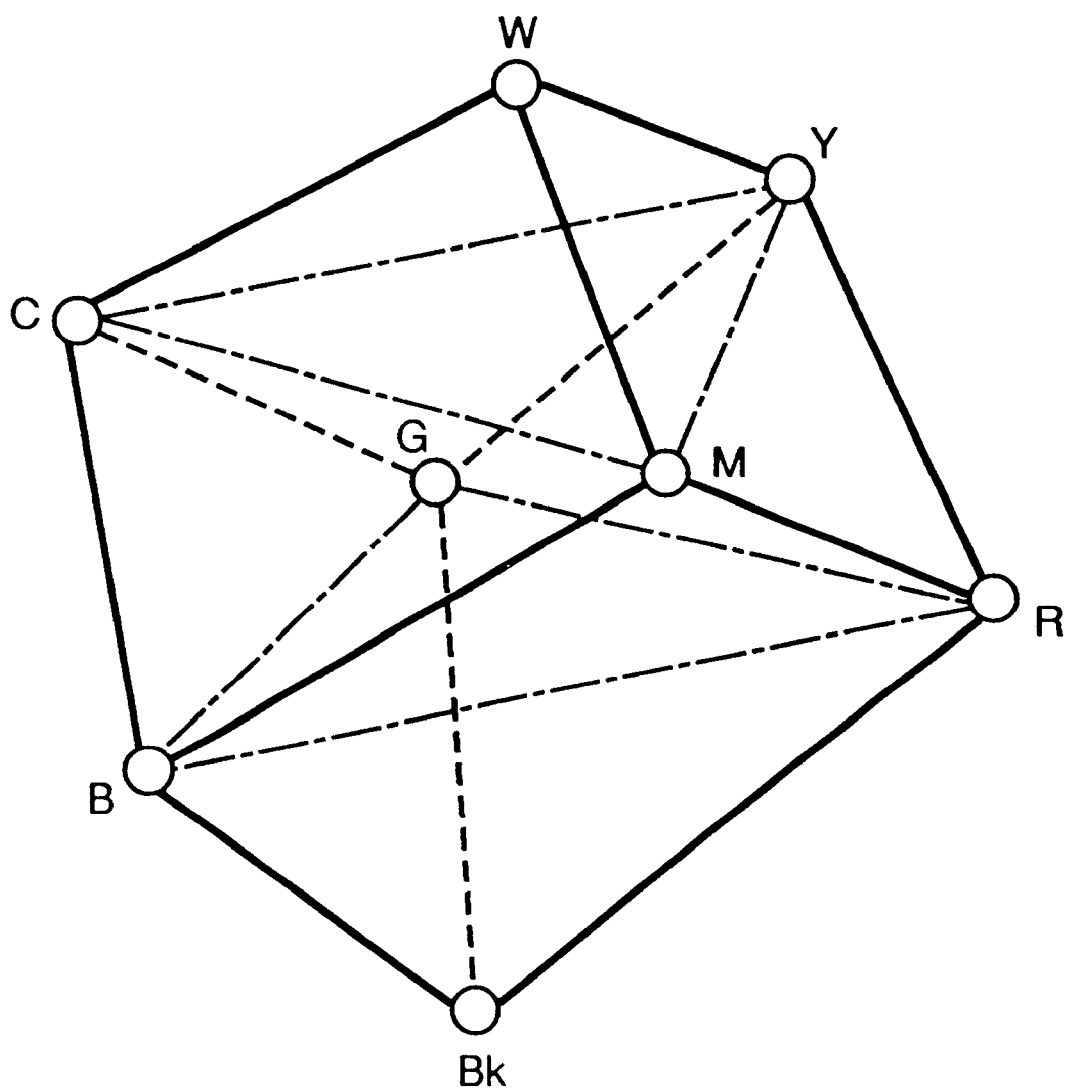
FIG. 34 shows an example of a conventional method of checking color reproduction of a device.

FIG. 33, composed of FIGS. 33A–33E, shows an example of color gamut compression.

Methods of color gamut compression are used to convert image data, an example of which is shown in FIG. 33A, to color data which can be expressed by an output device, an example of which is shown in FIG. 33B. Three general examples are described below.

The first method is to use a sense of human beings as shown in FIG. 33C. This is used to set the lightest and the darkest colors of the image data to the lightest and the darkest colors which can be expressed by the output device, respectively, and to convert other colors of the image data so that they are expressed in relative darkness between the lightest and the darkest colors to be expressed by the output device.

The second method, shown in FIG. 33D is to maintain the colors in the common color gamut of the image data and the output device, and to convert the color of image data outside of the common color gamut onto the border of the gamut of the output device with the intensity being maintained.

The third method, shown in FIG. 33E, is to maintain chromaticity of the colors outside of the common color gamut of the image data and the output device, and to compress them.

Figure 6:
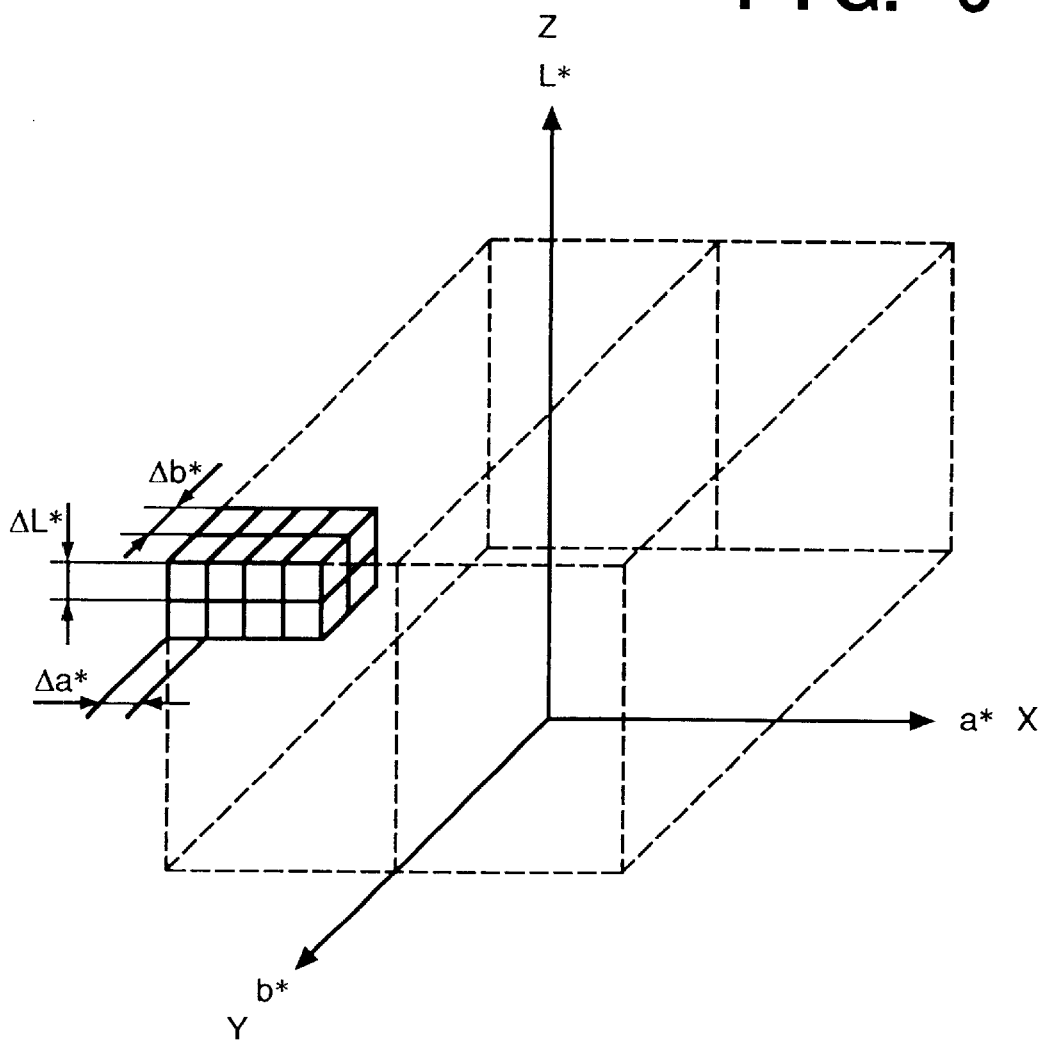
FIG. 6 is an example of a three dimensional LUT (look up table) used for color gamut compression according to the embodiment.

Further, there is a method which uses a three dimensional LUT (look up table) as one of the color gamut compression methods, and the LUT which is used for conversion by color gamut compression at step S13 according to the embodiment is shown in FIG. 6. The example of the LUT is a three dimensional table composed of a plurality of rectangular solids formed by dividing a color solid in a three dimensional space of L*a*b* in each coordinate direction at a uniform interval (ΔL*, Δa*, Δb*). At each intersection of lattices, namely each corner of the rectangular solid, a value of CMY corresponding to a sampling value of L*a*b* is stored.

Figure 7:
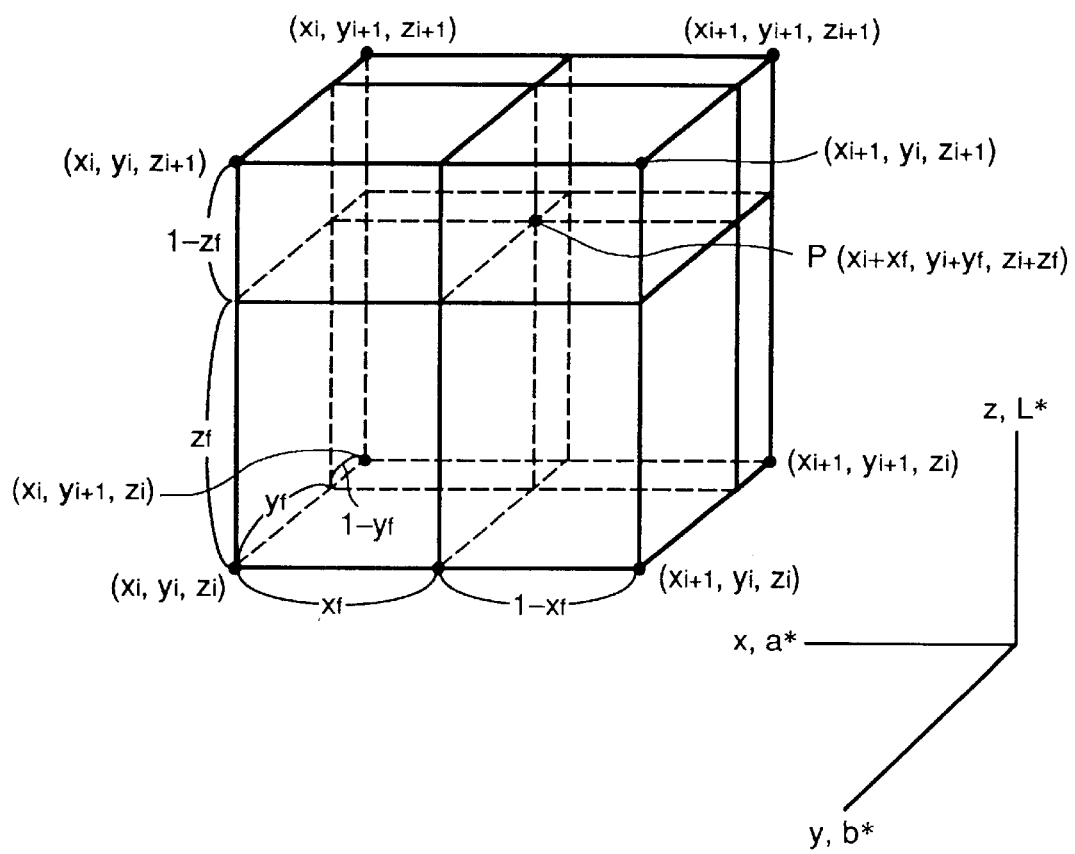
FIG. 7 is an expanded view of one of a cubic including input values of L*, a*, and b* to the LUT in FIG. 6.

FIG. 7 is an expanded view of one of the rectangular solids including a L*a*b* value inputted to the LUT in FIG.

6. Note that the z direction is L* axis, x direction is a* axis, and y direction is b* axis. Assume that the input L*a*b* value is at a point P.

When a left lower front point of the lattice is $(x_i, y_i, z_i)$ and $\Delta L^* = \Delta a^* = \Delta b^* = 1$, and the displacement from the left lower front point to the point P is $x_f, y_f, z_f$, then the coordinate points are shown in FIG. 7. Here, if the CMY value, stored at the each point of intersection of lattices, is denoted as U(x, y, z), then the CYM value of the point P, $U(x_i+x_f, y_i+y_f, z_i+z_f)$ can be obtained by utilizing an adding method as shown by following equations.

$$U(x_i+xf, y_i+y_f, z_i+z_f) = U(x_i, y_i, z_i) \times (1-x_f)(1-y_f)(1-z_f) +$$

$$U(x_i+1, y_i, z_i) \times x_f(1-y_f)(1-z_f) + U(x_i, y_i+1, z_i) \times (1-x_f) y_f (1-z_f) +$$

$$U(x_i, y_i, z_i+1) \times (1-x_f)(1-y_f) z_f + U(x_i, y_i+1, z_i+1) \times (1-x_f) y_f z_f +$$

$$U(x_i+1, y_i, z_i+1) \times x_f(1-y_f) z_f + U(x_i+1, y_i+1, z_i) \times x_f y_f (1-z_f) +$$

$$U(x_i+1, y_i+1, z_i) \times x_f y_f z_f \qquad \text{[Equation 1]}$$

As above, the CMY value corresponding to the input L*a*b* value can be obtained by using the LUT and the adding process.

By performing the aforesaid color gamut compression, an image can be reproduced by a printer more faithfully to the original.

Figure 8:
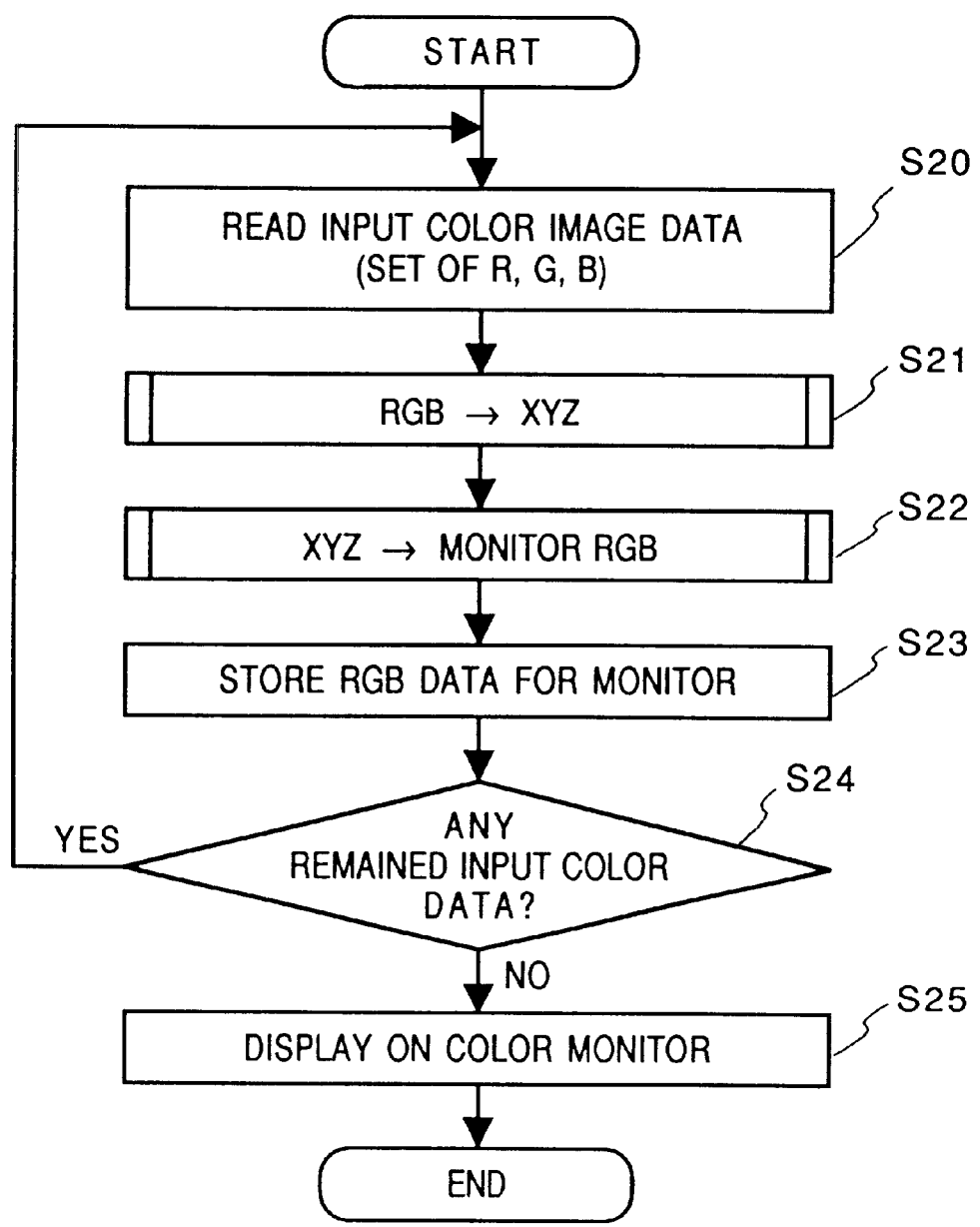
FIG. 8 is a flowchart showing a process to display an image on a color monitor after applying color reproduction process to input color image data according to the first embodiment.

Next, a process to transmit data to the color monitor 1 after applying the color reproduction to the input color image data at the host computer 2, especially, the color reproduction processor 2a, will be described below with reference to a flowchart in FIG. 8.

The host computer 2 reads a set of input color image data (luminance data for RGB) at step S20, as at step S10 in FIG. 2, then the process proceeds to step S21. There, the input color image data which is RGB data defined based on colorimetry (values of chromaticity of R, G, B, and white are definite) depends on the kind of input device.

At step S21, the read RGB data is converted into XYZ data, determined by CIE, in the color converter 29, then the process proceeds to step S22. At step S22, the color converter 29 further converts the XYZ data into RGB data depending on characteristics of a color monitor, after that the process moves to step S23. At step S23, the RGB data for a monitor is stored in the frame memory 24, and the process proceeds to step S24. At step S24, whether or not there is remaining input color data is checked. If there is, the process goes back to step S20.

If there is no input color image data left, the process moves to step S25, and the RGB data for the monitor which is stored in the frame memory is displayed on the color monitor 1 by using the VRAM 22, and the process is completed.

Since the input color image data and the monitor RGB data are RGB data defined based on colorimetry (values of chromaticity of R, G, B, and white are definite), there is relationship between aforesaid data and XYZ data determined by CIE as shown by equations in FIGS. 3 and 4. It is possible to apply the relationship equation in FIG. 3 in the process at step S21, and the relationship equation in FIG. 4, in the process at step S22. $P_{ij}$ (i, j=1, 2, 3) and $Q_{ij}$ (i, j, =1, 2, 3) are constants determined on the basis of colorimetry of input color image data and of monitor RGB for the color monitor 1.

Next, referring to FIG. 9, there will be described a characteristic process of the embodiment, in which it is checked on the color monitor 1 whether or not color image data (for example, R, G, B luminance data which is generated by utilizing an application software or the like) to be processed is in a color gamut of the color monitor 1 or the color printer 3, and an image is displayed on the color monitor 1 in accordance with the checked result.

Figure 9:
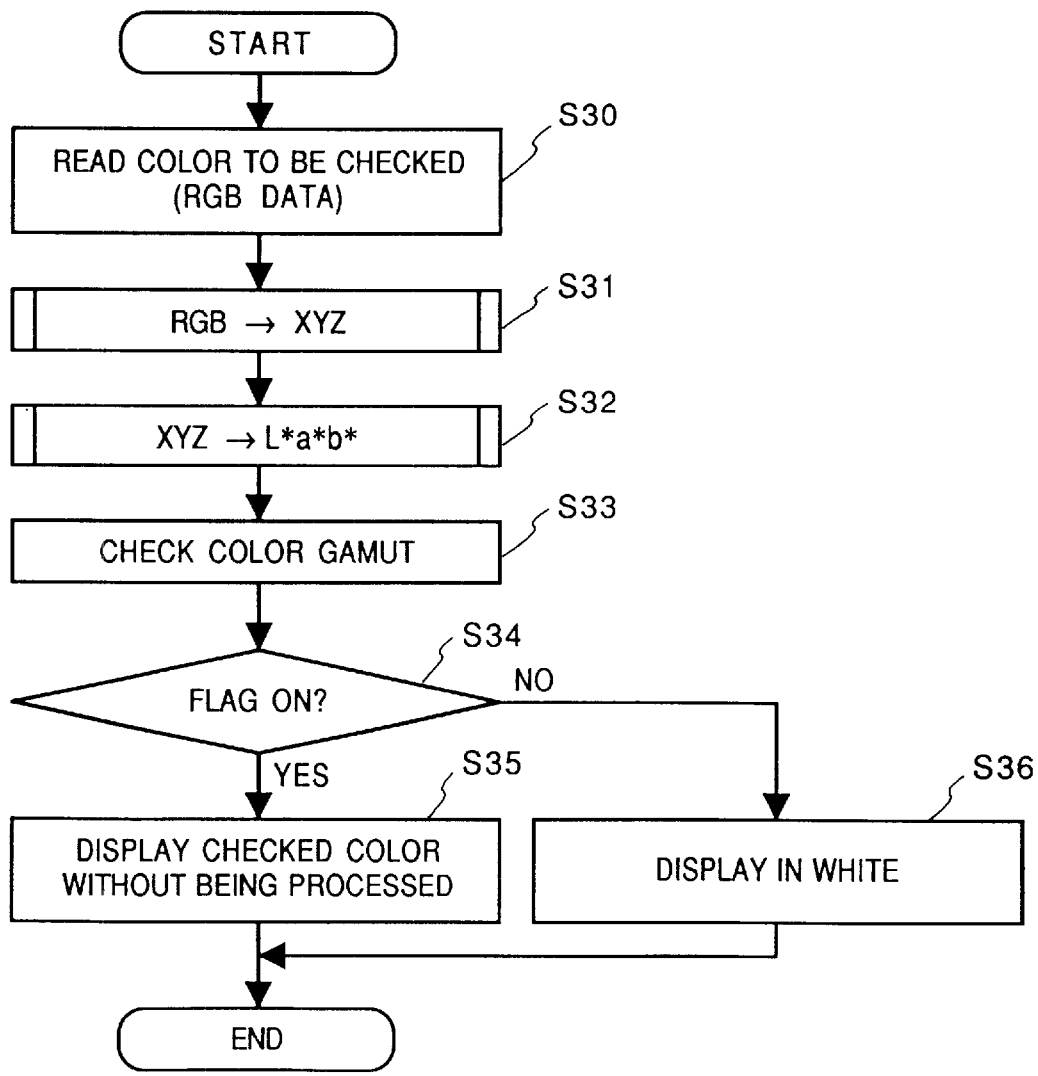
FIG. 9 is a flowchart showing a process in which whether or not the color image data to be processed is within a color gamut of an output device is determined, and the image is either displayed or not displayed on a color monitor on the basis of the determined result according to the embodiment.

FIG. 9 is a flowchart showing a process of checking the color gamut, in the host computer 2, especially in the color gamut check unit 28, in which it is checked whether or not data, obtained by transforming color image data (R, G, B luminance data) which is generated by using an application software or the like on the color monitor 1 so as to be in a color space of an output device, such as the color monitor 1 or of the color printer 3, is in a color gamut of the output device, and a process to display an image on the color monitor 1 in accordance with the checked result.

In FIG. 9, the host computer 2 reads color (a set of R, G, B luminance data) to be checked for a color gamut at step S30, and the process moves to step S31. Note that RGB data which depends on the characteristics of the color monitor 1, and defined on the basis of colorimetry (values of chromaticity of R, G, B, and white are definite) is used as the color to be checked.

At step S31, the read RGB data at step S30 is converted into XYZ data, defined by CIE, by the color converter 29, then the process moves to step S32. At step S32, the XYZ data is further converted into L*a*b* data by the color converter 29, and the process proceeds to step S33. At step S33, whether or not the converted L*a*b* data can be reproduced by the color printer 3 is checked. If so, a flag is turned ON, whereas, if not, a flag is turned OFF, and the process moves to step S34.

At step S34, whether the flag set at step S33 is ON or OFF is checked. If the flag is not ON, the process moves to step S36, and the checked color is displayed in white, and a process is completed. Whereas, if the flag is ON, since it is possible to reproduce colors without processing any further, the process moves to step S35, and the checked color is displayed on the color monitor 1 without being processed, then the process is completed.

The aforesaid process is applied to all sets of the input image data.

Therefore, in a case where the color to be checked is within the color gamut of an output device, such as the color printer 1 or of the color monitor 3, the checked color is faithfully reproduced on the color monitor 1. Whereas in a case where the checked color is outside of the color gamut, the checked color is displayed in white on the color monitor 1 to inform a user, so that the user can recognize which color at which part is outside of the color gamut.

Note that the checked color is represented by white when the color is outside of a color gamut. However, it is not limited to white as long as the user knows that the checked color is outside of the color gamut, thus black can be used instead of white, for instance.

Figure 10:
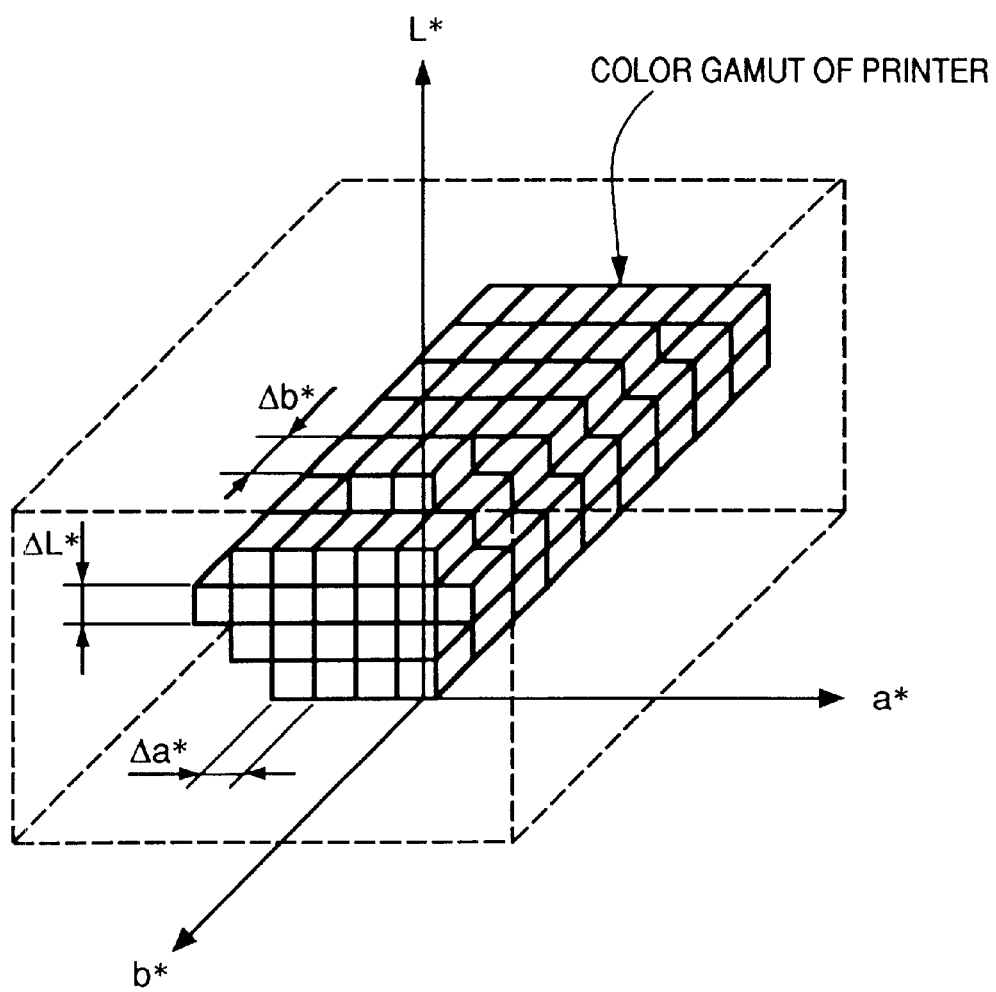
FIG. 10 is an example of a color gamut of a printer inside of a L* a* b* solid according to the embodiment.

As seen in FIG. 10, the aforesaid range of lattice which includes the L*a*b* value inputted to the LUT shown in FIG. 6 differs depending on the value of L*. Therefore a, feature of the embodiment is to have data of the range of lattice as color reproduction information and is to use the information to perform color gamut check. The feature will be described in accordance with the following four embodiments.

It should be noted that values of $\Delta L^*$, $\Delta a^*$, and $\Delta b^*$ can be the minimum value which L*, dispersion data, can take as a predetermined interval.

FIRST EMBODIMENT

Figures 11, 12:
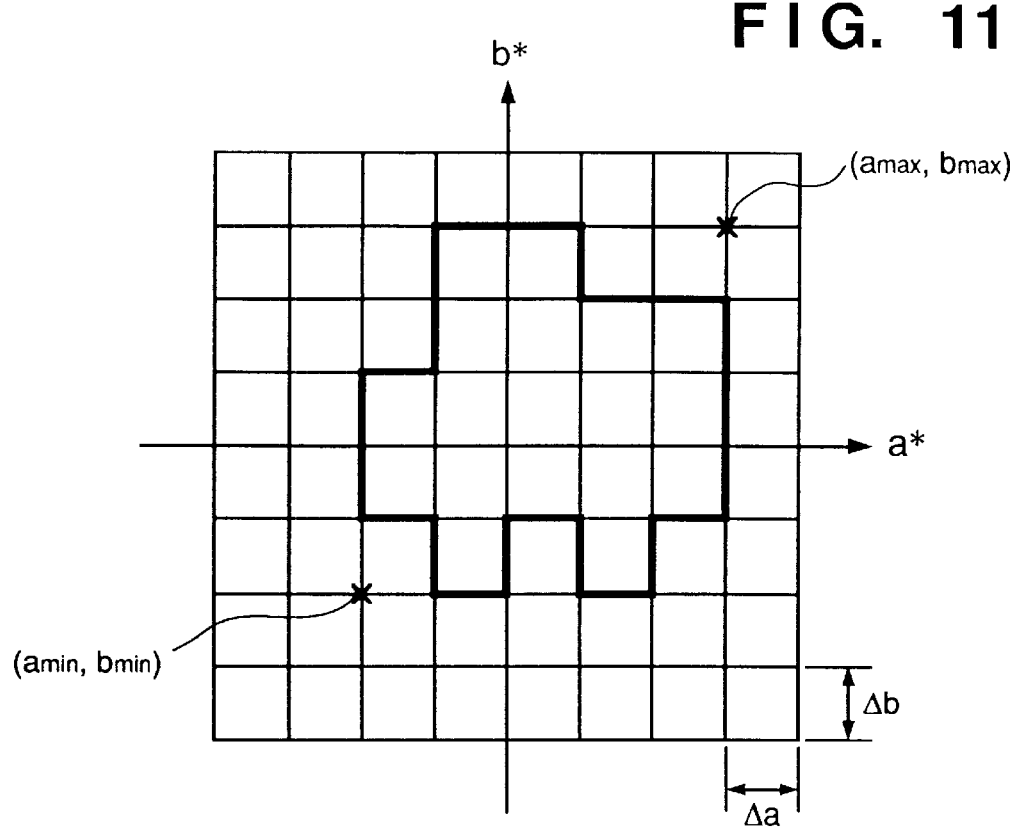
FIG. 11 is an example showing a case where a color gamut of a monitor or a printer is defined by an area in a two dimensional plane of a* and b*, constructed with rectangular lattices, which is obtained by slicing a three dimensional color solid in the direction perpendicular to the L* axis according to a first embodiment.
FIG. 12 shows an example of a color gamut date table in a case where the gamut of a monitor or a printer is defined by an area constructed with rectangular lattices according to the first embodiment.

According to a first embodiment, a gamut of a printer, one of output devices, is defined by an area including all the area inside of a bold line in FIG. 11, and the color gamut is checked based on the defined area information. Let the area be defined by two points, ($a_{max}$, $b_{max}$) and ($a_{min}$, $b_{min}$). Since the size of the area changes depending on the value of L*, an example of a color gamut data table in the first embodiment is shown in FIG. 12. In this embodiment, tables are stored in the color gamut information memory 27.

An area surrounded by bold line in FIG. 11 shows the color gamut.

Note that a number L within $L^*_{min}$ and $L^*_{max}$ is m (constant).

Figure 13:
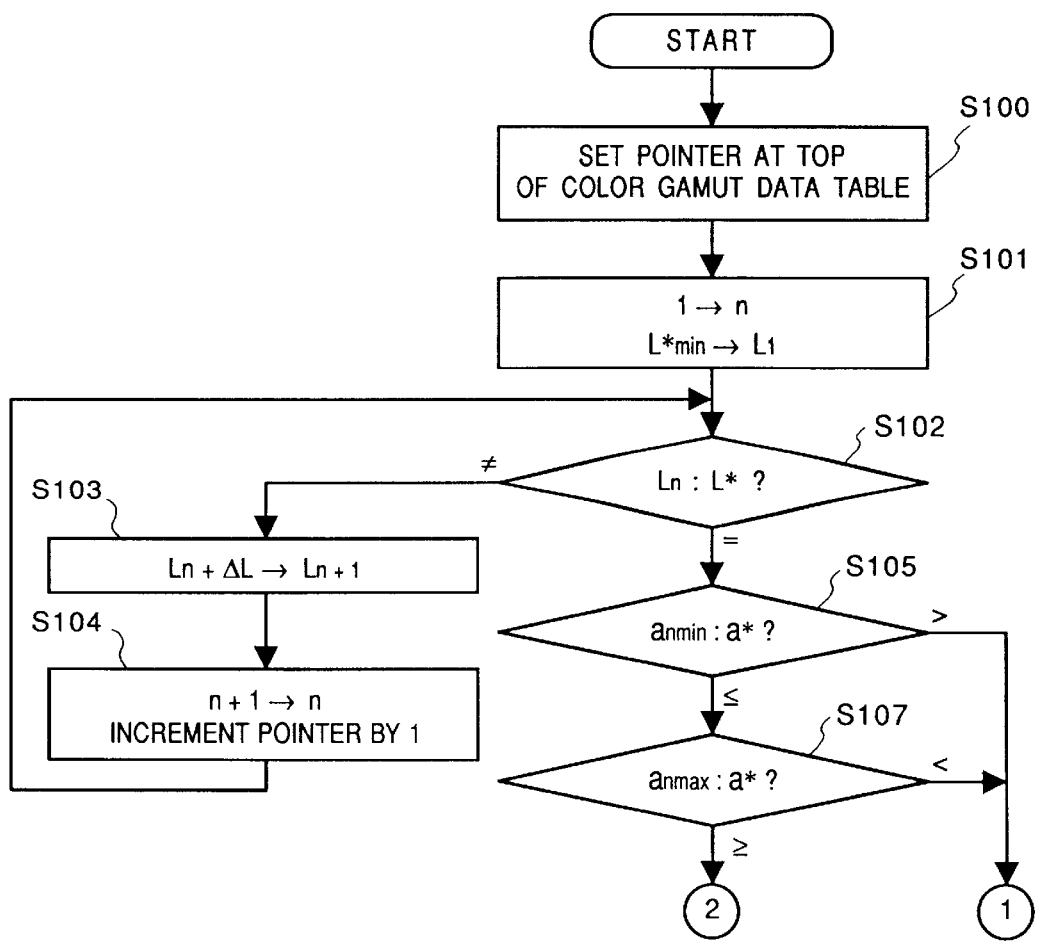
FIG. 13 is a flowchart illustrating a process of checking the color gamut on the basis of the color gamut data table in FIG. 12.
Figure 14:
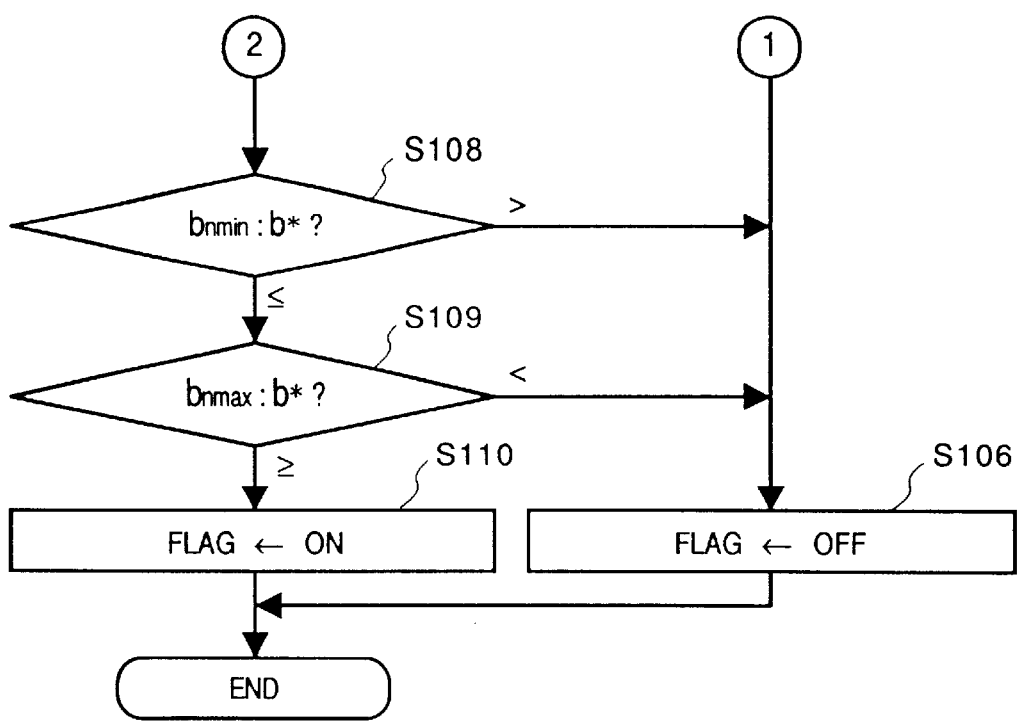
FIG. 14 is a flowchart illustrating a process of checking the color gamut on the basis of the color gamut data table in FIG. 12.

FIGS. 13 and 14 are flowcharts of checking the color gamut on the basis of the color gamut data table in FIG. 12 by the host computer 2, especially by the color reproduction checking unit 28.

First, the host computer 2 sets a pointer at the top of the color gamut data table in FIG. 12 at step S100, and the process proceeds to step S101. At step S101, a constant n is set to 1 and L1 is set to $L^*_{min}$, then the process moves to step S102. At step S102, the read L* is compared with $L_1$. If the values of L* and $L_1$ are not identical, then the process moves to step S103, thereat $L_{n+1}$ is set to $L_n + \Delta L$, then the process further moves to step S104. At step S104, values of n and pointer are incremented by 1, and process goes back to step S102.

If the read L* has the same value as $L_1$, then the process proceeds to step S105, and the read a* is compared with $a_{nmin}$. If a* is smaller than $a_{nmin}$, then the process moves to step S106, thereat a flag is set OFF and the process is completed.

RGB data of a color to be checked is RGB data defined on the basis of colorimetry (values of chromaticity of R, G, B, and white are definite), therefore, the equations in FIGS. 3 and 4 are held to represent a relationship between the RGB data and the XYZ data which is defined by CIE. It is possible to use the equation in FIG. 3 in the process at step S31. $P_{ij}$ (i, j=1, 2, 3) and $Q_{ij}$ (i, j, =1, 2, 3) are constants depending on definition based on colorimetry of monitor RGB for the color monitor 1.

A process at step S32 in FIG. 9 is the same as the aforesaid process in FIG. 5. Note that Xn, Yn, and Zn are the value depending on type of CIE standard light source to be used.

At step S33 in FIG. 9, L*a*b* data of the color to be checked which is obtained at step S32, is checked whether or not it is within color gamut, and the result is outputted as a value of a flag. A color gamut of a printer is included in a L*a*b* color solid, and as shown in FIG. 10, the range can be designated by using the three dimensional solids which are produced by dividing the color solid of L*a*b* three dimensions in the each coordinate direction at a fixed interval ($\Delta L^*$, $\Delta a^*$, $\Delta b^*$), whose process is the same as the one in FIG. 6.

Further, regarding a color gamut of a monitor, although the range differs from the range of a printer, the range can be designated by using the three dimensional lattices which are produced when the color solid of L*a*b* three dimensions is divided in the each coordinate direction at a fixed interval ($\Delta L^*$, $\Delta a^*$, $\Delta b^*$), similarly.

When the three dimensional color solid is sliced in the direction which is perpendicular to L*, the cut surface is the two dimensional plane of a* and b* which is constructed with rectangular (square, in the first embodiment) areas. Lengths of sides of each rectangular area are $\Delta a^*$ and $\Delta b^*$, as shown in FIG. 11. Note that the area surrounded by a closed bold line indicates a range of lattices including the color gamut of a monitor or a printer in the sliced two dimensional plane perpendicular to L*.

Therefore, in accordance with whether or not the three dimensional lattices including input image data are within the designated range, whether or not the input image data is within a color gamut of a color reproduction device is determined.

If it is determined at step S105 that a* is not smaller than $a_{nmin}$, then the process moves to step S107, thereat read a* is compared with $a_{nmax}$. If a* is larger than $a_{nmax}$, then the process moves to step S106, where a flag is set OFF and the process is completed.

If a* is not larger than $a_{nmax}$ at step S107, then the process proceeds to step S108, where read b* and $b_{nmin}$ are compared. If b* is smaller than $b_{nmin}$, the process moves to step S106, thereat a flag is set OFF and the process is completed.

If it is determined at step S108 that b* is not smaller than $b_{nmin}$, then the process proceeds to step S109, and the read b* and $b_{nmax}$ are compared. If b* is larger than $b_{nmax}$, the process moves to step S106, thereat a flag is set OFF and the process is completed.

If b* is not larger than $b_{nmax}$, then the process proceeds to step S110, and the process is completed after a flag is set ON.

Accordingly, a color gamut is easily checked based on the color gamut data table in FIG. 12.

SECOND EMBODIMENT

Figure 15:
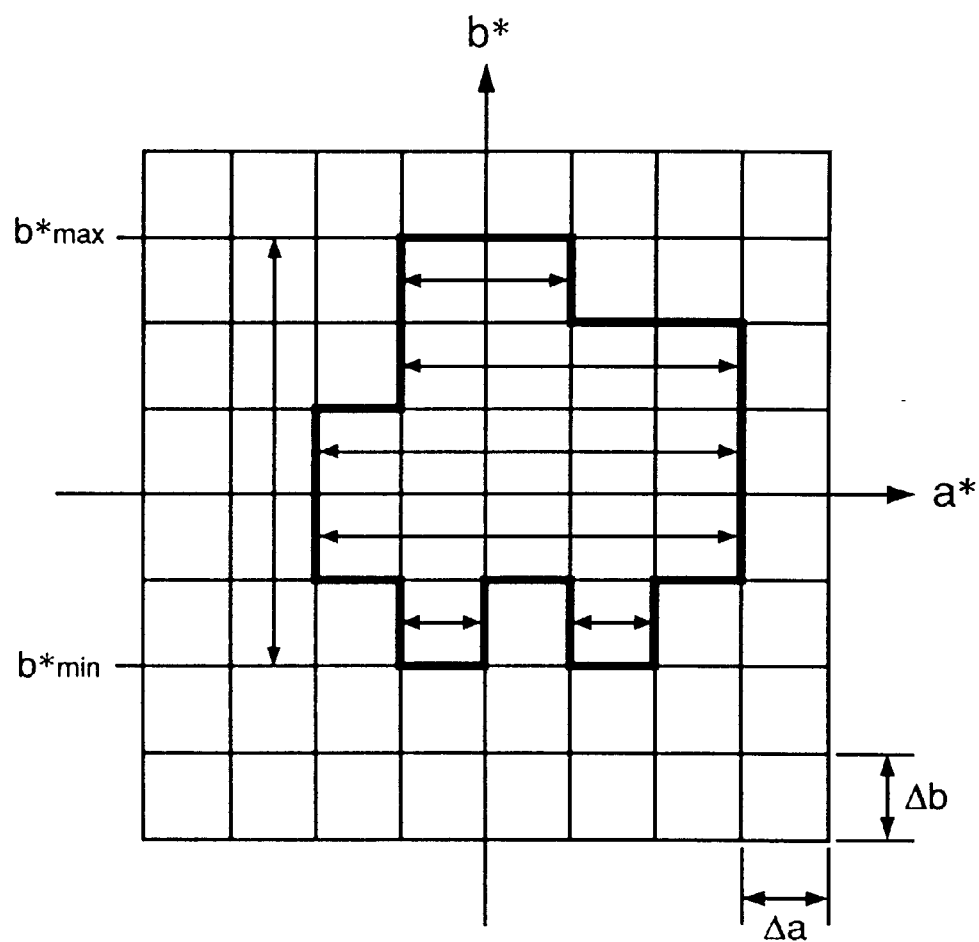
FIG. 15 shows an example in a case where the color gamut of a monitor or a printer is defined by the two dimensional range of a* and b*, constructed with rectangular lattices, which is obtained by slicing the three dimensional color solid in the direction perpendicular to the L* axis according to a second embodiment.

According to a second embodiment, a color gamut of a printer or a monitor is defined by a two dimensional coordinate range including all the area inside of a bold line in FIG. 15, and the color gamut is checked based on the defined area information. In FIG. 15, the coordinate ranges is decided in accordance with $a_{min}$ and $a_{max}$ in each b* lattice range in lattice range between b*min and b*max. These tables indicating the color gamuts are stored in the color gamut information memory 27.

Figure 16:
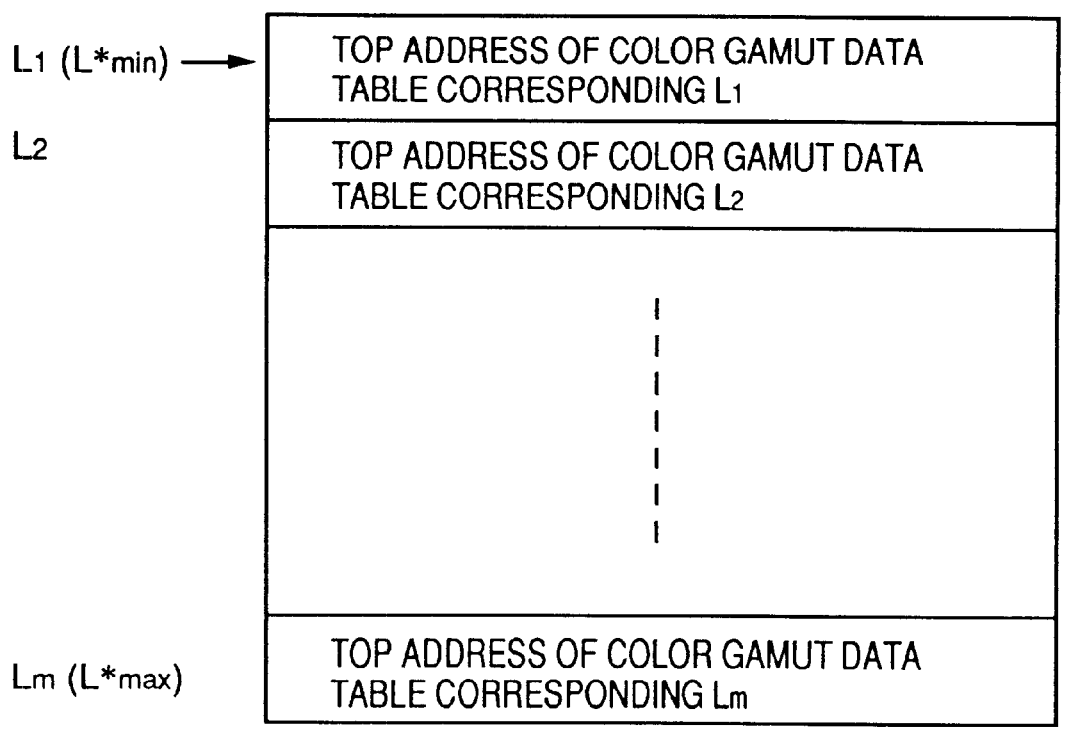
FIG. 16 is an address table where a top address of the color gamut data table in FIG. 17 is stored according to the second embodiment.

FIG. 16 is an address table which stores top addresses of the aforesaid color gamut data table shown in FIG. 17 in the second embodiment. As shown in FIG. 16, in the address table of the second embodiment, a number L within a range between $L^*_{min}$ and $L^*_{max}$ is m (constant).

In the color gamut data table in FIG. 17, information on the range of a* in each lattice within a range between $b^*_{min}$ and $b^*_{max}$ is stored. Note that, as shown in FIG. 15, for example, there can be two a* ranges corresponding to a range between $b^*_{min}$ and $b^*_{min} + \Delta b$, and likewise there can be a case where there are a plurality of a* ranges in a arbitrary b* lattice range. Constants in FIG. 17, $i_1$, $i_2$, ..., in correspond to a number in the a* range in each b* lattice range.

FIG. 18 is a color gamut data table representing the color gamut of a printer shown in FIG. 15, when $\Delta a = \Delta b = 1$.

Figure 19:
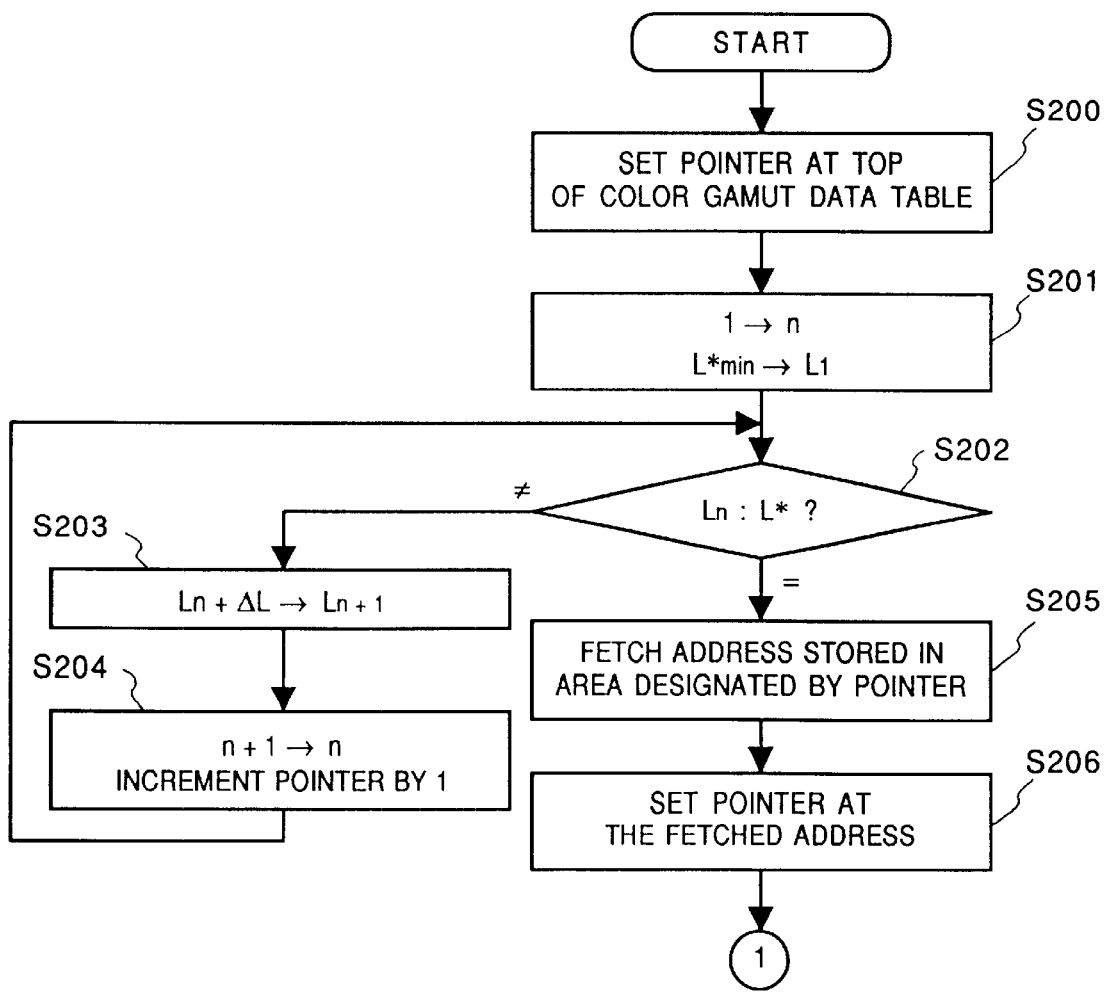
FIG. 19 is a flowchart showing a process of checking the color gamut on the basis of the tables, shown in FIGS. 16 and 17, which are for displaying the color gamuts according to the second embodiment.
Figure 20:
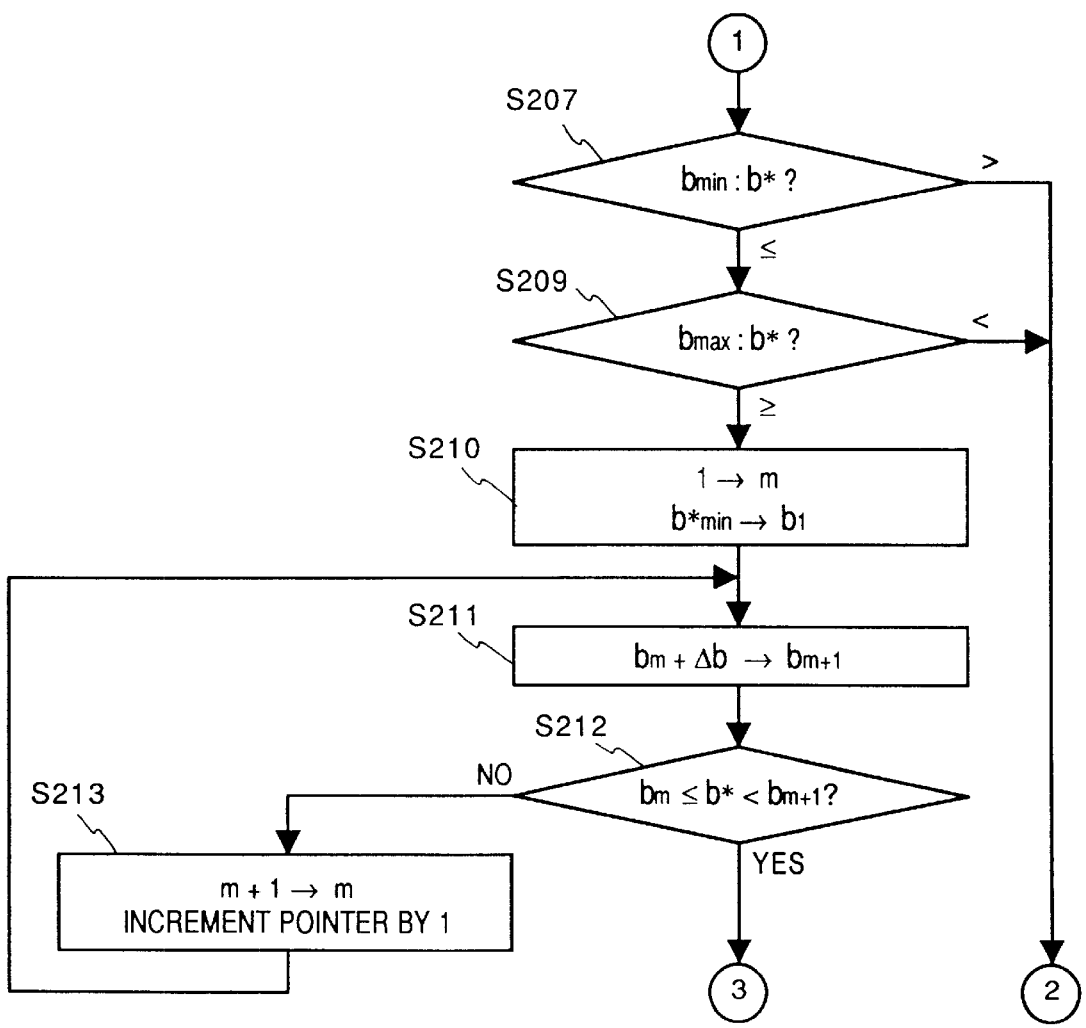
FIG. 20 is a flowchart showing a process of checking the color gamut on the basis of the tables, shown in FIGS. 16 and 17, which are for displaying the color gamuts according to the second embodiment.
Figure 21:
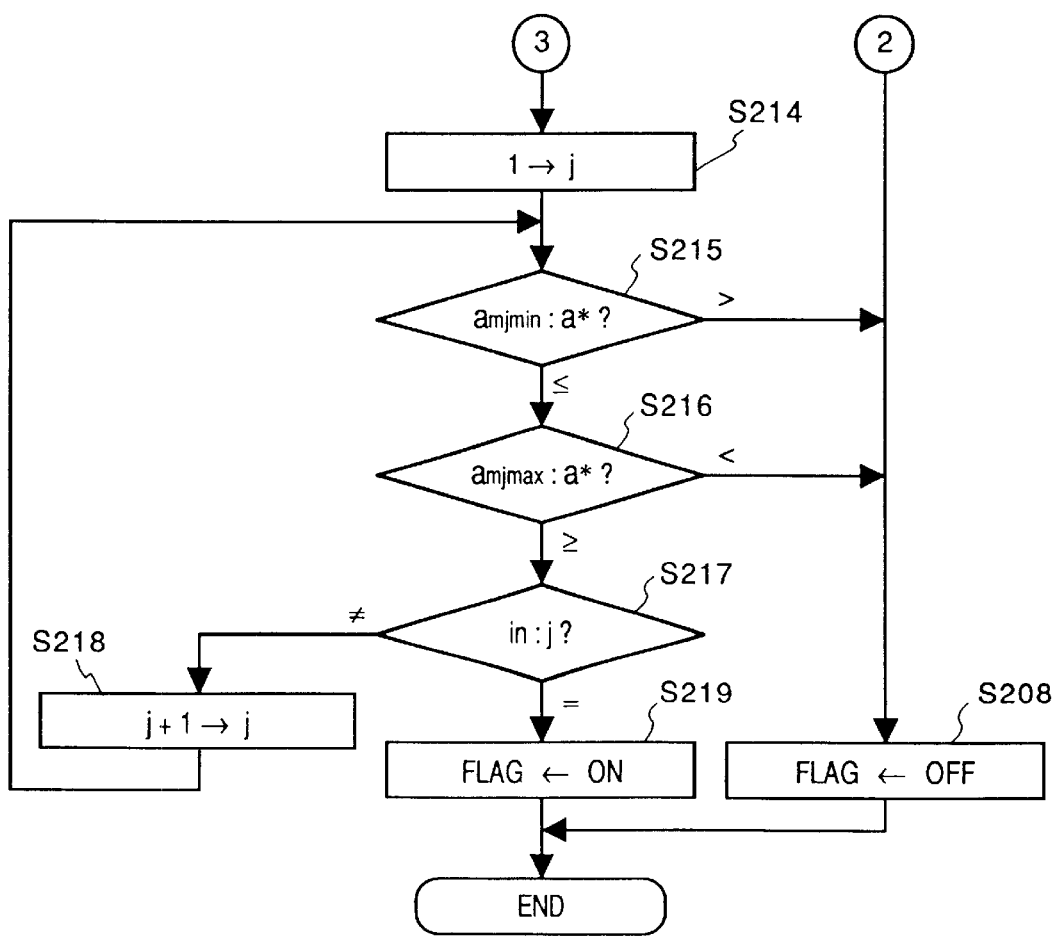
FIG. 21 is a flowchart showing a process of checking the color gamut on the basis of the tables, shown in FIGS. 16 and 17, which are for displaying the color gamuts according to the second embodiment.

FIGS. 19 to 21 are flowcharts showing a process for checking a color gamut on the basis of a information table for representing a color gamut described in FIGS. 16 and 17 by the host computer 2, especially the color gamut checking unit 28. A process of checking a color gamut in the second embodiment will be described below with reference to FIGS. 19 to 21.

First, at step S200 in FIG. 19, a pointer is set at the top of the address table shown in FIG. 16, and the process moves to step S201. At step S201, a constant n is set to 1 and $L_1$ is set to $L^*_{min}$, then the process further proceeds to step S202. Successively at step S202, the read L* is compared with $L_1$. If the values of L* and $L_1$ are not identical, then the process moves to step S203, thereat $L_{n+1}$ is set to $L_n+\Delta L$ and the process proceeds to step S204. At step S204, n and pointer are incremented by 1, and the process goes back to step S202.

If L*, read at step S202, and $L_1$ have the same value, the process proceeds to step S205, thereat an address which is stored in the area that the pointer indicates is fetched, then the process further proceeds to step S206. At step S206, the pointer is set to the fetched address, and the process moves to step S207 in FIG. 20. At step S207, the read b* is compared with $b_{min}$. If b* is smaller than $b_{min}$, then the process moves to step S208 in FIG. 21, thereat a flag is set OFF to complete the process.

Whereas, if b* is not smaller than $b_{min}$ at step S207, then the process moves to step S209, thereat the read b* is compared with $b_{max}$. If b* is larger than $b_{max}$, then the process moves to step S208 in FIG. 21, thereat a flag is set OFF to complete the process.

If it is determined at step S209 that b* is not larger than $b_{max}$, then the process proceeds to step S210, thereat the constant m is set to 1 and b1 is set to $b^*_{min}$, and the process moves to S211. At step S211, $b_{m+1}$ is set to $b_m+\Delta b$, and the process proceeds to step S212. At step S212, whether or not the read b* fulfills a relationship, $b_m \leq b^* < b_{m+1}$, is checked. If not, the process proceeds to step S213, thereat m and pointer are incremented by 1, then the process goes back to step S211.

If the read b* fulfills the relationship, $b_m \leq b^* < b_{m+1}$, then the process moves to step S214 in FIG. 21, thereat the constant j is set to 1, and the process proceeds to step S215. At step S215, the read a* is compared with $a_{mjmin}$. If a* is smaller than the $a_{mjmin}$, the process moves to step S208, thereat a flag is set OFF to complete the process.

If it is determined at step S215 that a* is not smaller than $a_{mjmin}$, then the process proceeds to step S216, thereat the read a* and $a_{mjmin}$ are compared. If a* is larger than $a_{mjmin}$, the process moves to step S208, thereat a flag is set OFF to complete the process.

If it is determined at step S216 that a* is not larger than $a_{mjmin}$, the process proceeds to step S217, thereat in is compared with j. If in and j have the same value, then the process moves to step S219, where a flag is set ON, and the process is completed.

If it is determined at step S217 that in and j do not have the same value, then the process proceeds to step S218, thereat j is incremented by 1, and the process goes back to step S215.

As described above, a color reproduction can be easily checked by using information tables in FIGS. 16 and 17 representing a color gamuts.

THIRD EMBODIMENT

According to a third embodiment, a gamut of a monitor or a printer is defined by bit map tables corresponding to a lattice area, and the color gamut is checked based on the defined bit map information. In the third embodiment, a bit map table is a color gamut data table, and its top is the bit corresponding to a lattice including the left uppermost point, ($a_{min}$, $b_{max}$), in FIG. 22. In FIG. 22, let an area surrounded by a bold line be a color gamut of a monitor or a printer, and let the bits outside of the color gamut be OFF, and the bits inside of the range be ON, the bit map table corresponding a case shown in FIG. 22 is represented as in FIG. 23.

Figure 23:
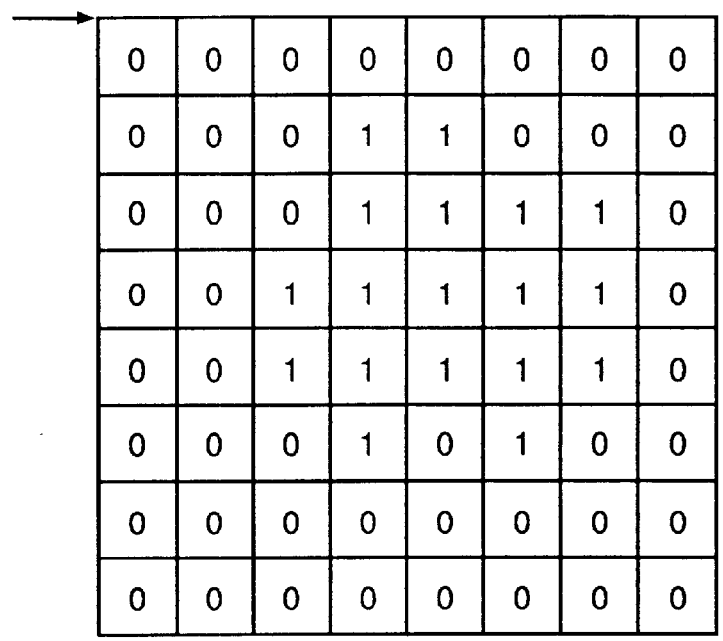
FIG. 23 is an example of a bit map table in a case where the gamut in FIG. 22 is defined by bit map according to the third embodiment.
Figure 24:
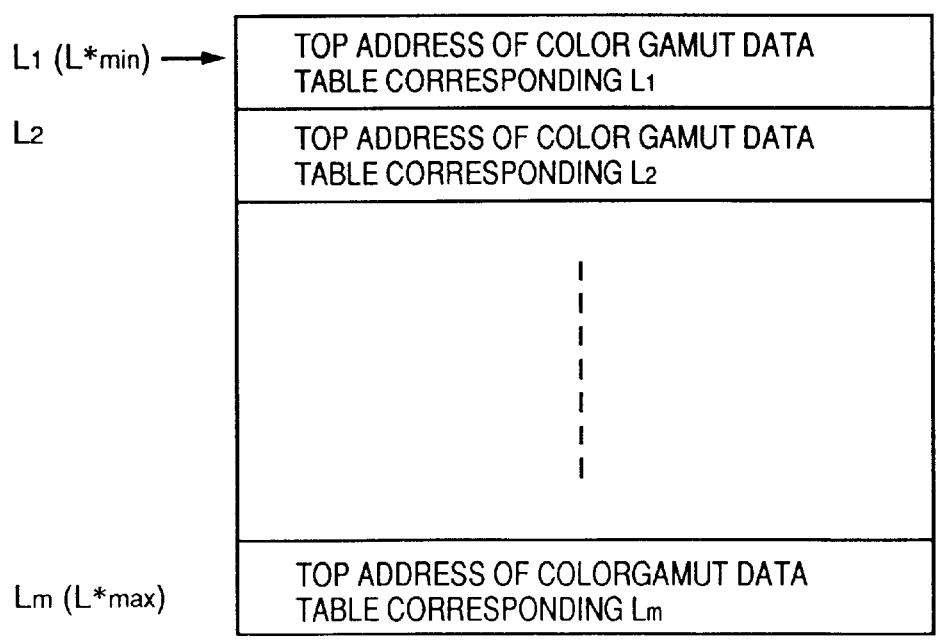
FIG. 24 shows an address table storing a top address of the color gamut data table in FIG. 23, as an example, according to the third embodiment.

Note that the size of a coordinate range differs depending on a value of L*, therefore color gamut data tables for respective L*'s differ from each other. FIG. 24 is an address table where the top address of a color gamut data table, such as the one shown in FIG. 23, is stored. In FIG. 24, the number of L within the range between $L^*_{min}$ and $L^*_{max}$ is m (constant).

The tables shown in FIGS. 23 and 24 are stored in the color gamut information memory 27.

Figure 25:
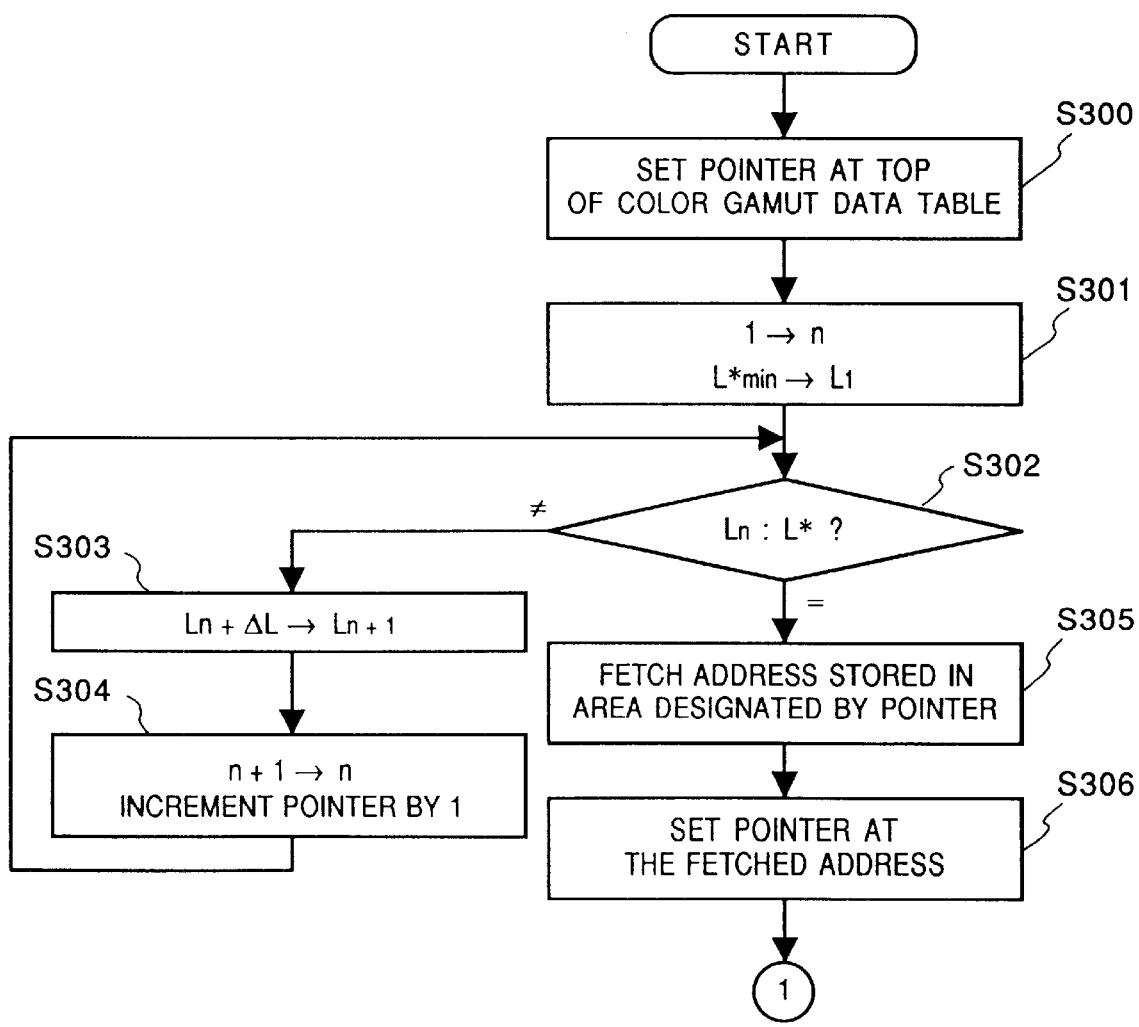
FIG. 25 is a flowchart showing a process of checking the color gamut on the basis of the tables, shown in FIGS. 23 and 24, for displaying the color gamuts according to the third embodiment.
Figure 26:
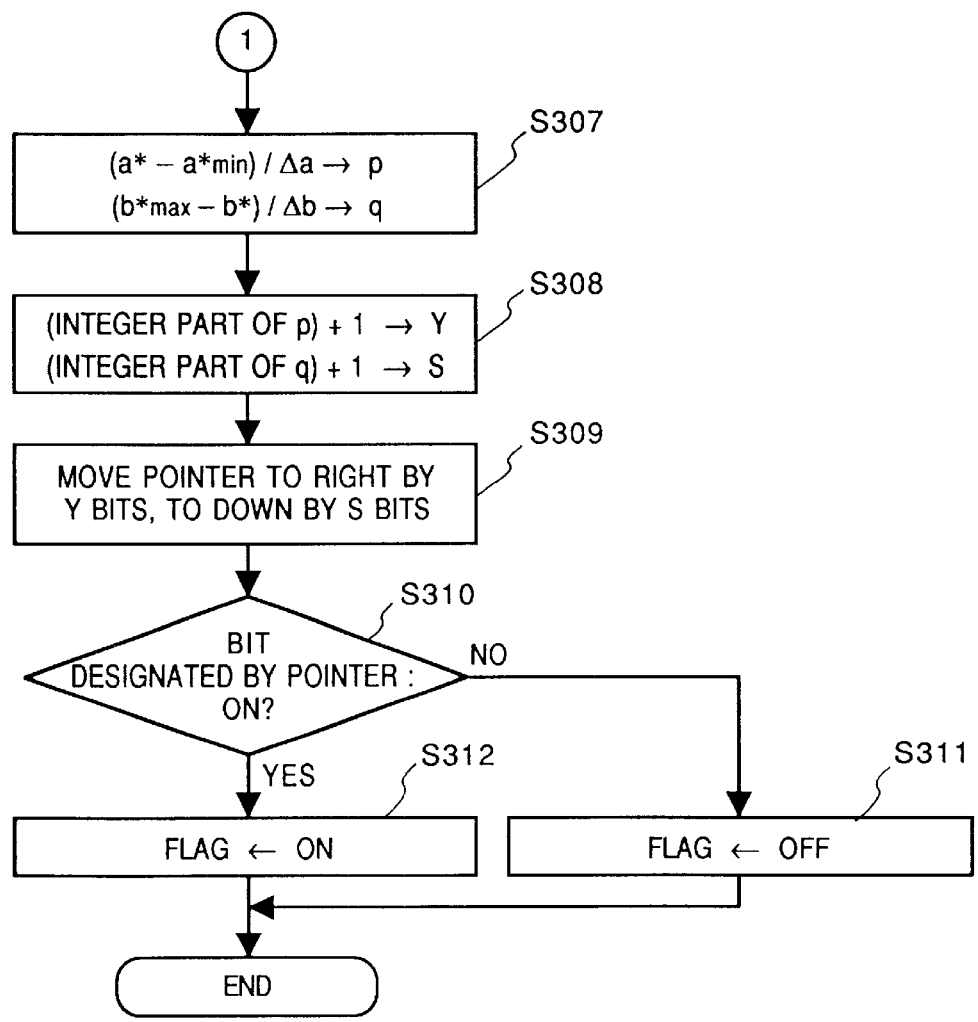
FIG. 26 is a flowchart showing a process of checking the color gamut on the basis of the tables, shown in FIGS. 23 and 24, for displaying the color gamuts according to the third embodiment.

FIGS. 25 and 26 are flowcharts for checking the color gamut on the basis of information tables representing the color gamut data tables in FIGS. 23 and 24 by the host computer 2, especially by the color reproduction check unit 28. Below, the process to check the color gamut according to the third embodiment will be described with reference to FIGS. 25 and 26.

In the third embodiment, first, at step S300 in FIG. 25, a pointer is set at the top of an address table in FIG. 24, then the process proceeds to step S301. At step S301, the constant n is set to 1 and $L_1$ is set to $L^*_{min}$, and the process moves to step S302. At step S302, the read L* is compared with $L_1$. If the values of L* and $L_1$ is not the same, the process moves to step S303, thereat $L_{n+1}$ is set to $L_n+\Delta L$, and the process further moves to step S304. At step S304, n and the pointer are incremented by 1, then the process goes back to step S302.

Whereas, if it is determined at step S302 that L* and $L_1$ have the same value, then the process proceeds to step S305, thereat an address which is stored in the area that the pointer indicates is fetched, and the process further proceeds to step S306. A pointer is set to the address fetched at step S306, then the process moves to step S307 in FIG. 26. At step S307, by using a* and b*, a value obtained by dividing ($a^*-a^*_{min}$) by $\Delta a$ is set to a constant p, and a value obtained by dividing ($b^*_{max}-b^*$) by $\Delta b$ is set to a constant q, then the process moves to step S308.

At step S308, a value obtained by adding 1 to the integer part of p is set to a constant r, a value obtained by adding 1 to the integer part of q is set to a constant s, then the process proceeds to step S309. At step S309, the pointer is moved r bits to the right and s bits down, and the process moves to step S310. Then at step S310, the bit indicated by the pointer is checked. In a case where the bit indicated by the pointer is not ON, the process moves to step S311, thereat a flag is set OFF to complete the process.

If the bit indicated by the pointer is ON, the process moves to step S312, thereat the flag is set ON to complete the process.

As described above, the color gamut can be easily checked on the basis of the information tables in FIGS. 23 and 24 representing the color gamuts.

FOURTH EMBODIMENT

Figures 27, 28:
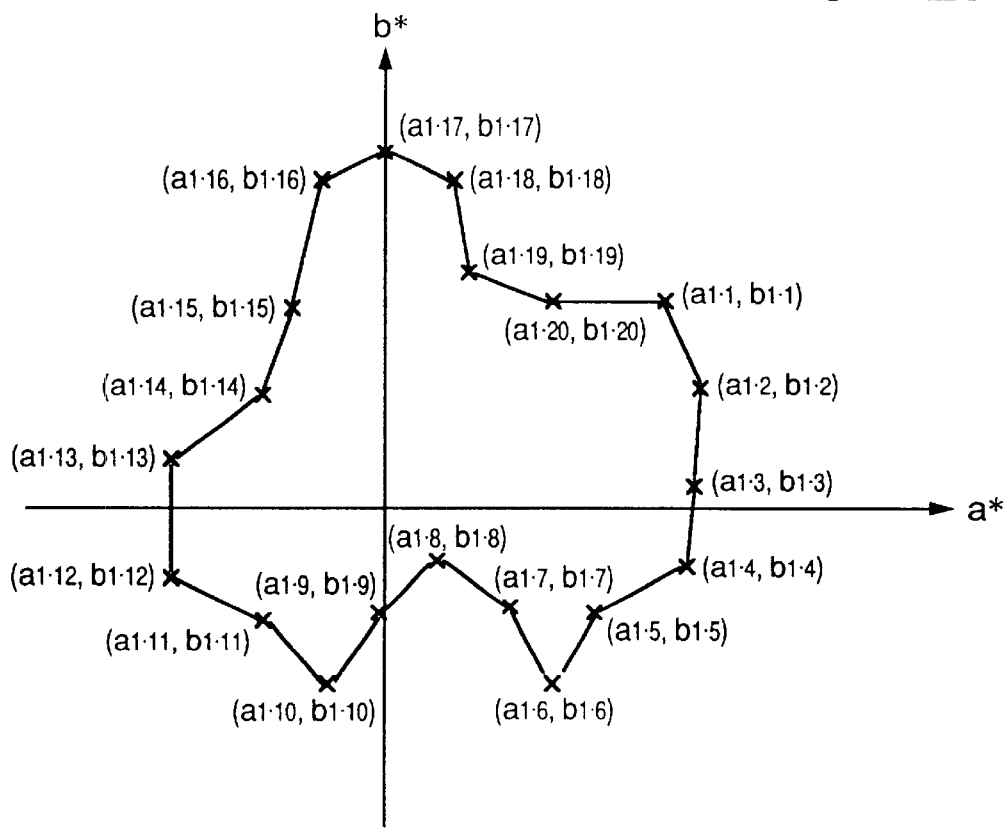
FIG. 27 is an example of a case where a gamut of a monitor or a printer is defined by an area, surrounded by coordinate points and lines which connect the coordinate points in the two dimensional area of a* and b*, constructed with rectangular lattices, which is obtained by slicing the three dimensional color solid in the direction perpendicular to the L* axis according to a fourth embodiment.
FIG. 28 is a color gamut data table in a case where a reproduction area of a monitor or a printer is defined by an area which is surrounded by coordinate points and lines which connect the coordinate points according to the fourth embodiment.

In a fourth embodiment, there is described a process in which a gamut of a monitor or a printer is defined by an area surrounded by coordinate points as shown in FIG. 27, then a color gamut is checked on the basis of the information on the area.

FIG. 27 shows an example of a gamut in $L^*_{min}$ which is expressed with the 20 coordinate points in this example. Since the size of the surrounded area changes depending on a value of L*, an example of a color gamut data table which corresponds to the value of L* is shown in FIG. 28 in the fourth embodiment. The range of L* is from $L^*_{min}$ to $L^*_{max}$, and there are values, in the table, of coordinate points corresponding to the various L*'s. A number of L in the range between $L^*_{min}$ and $L^*_{max}$ is m (constant). Further, a number of constants $i_1, i_2, i_n$ is as same as the number of coordinate points each of which is corresponding each value of L*. The table in the fourth embodiment is stored in the color gamut information memory 27.

Figure 29:
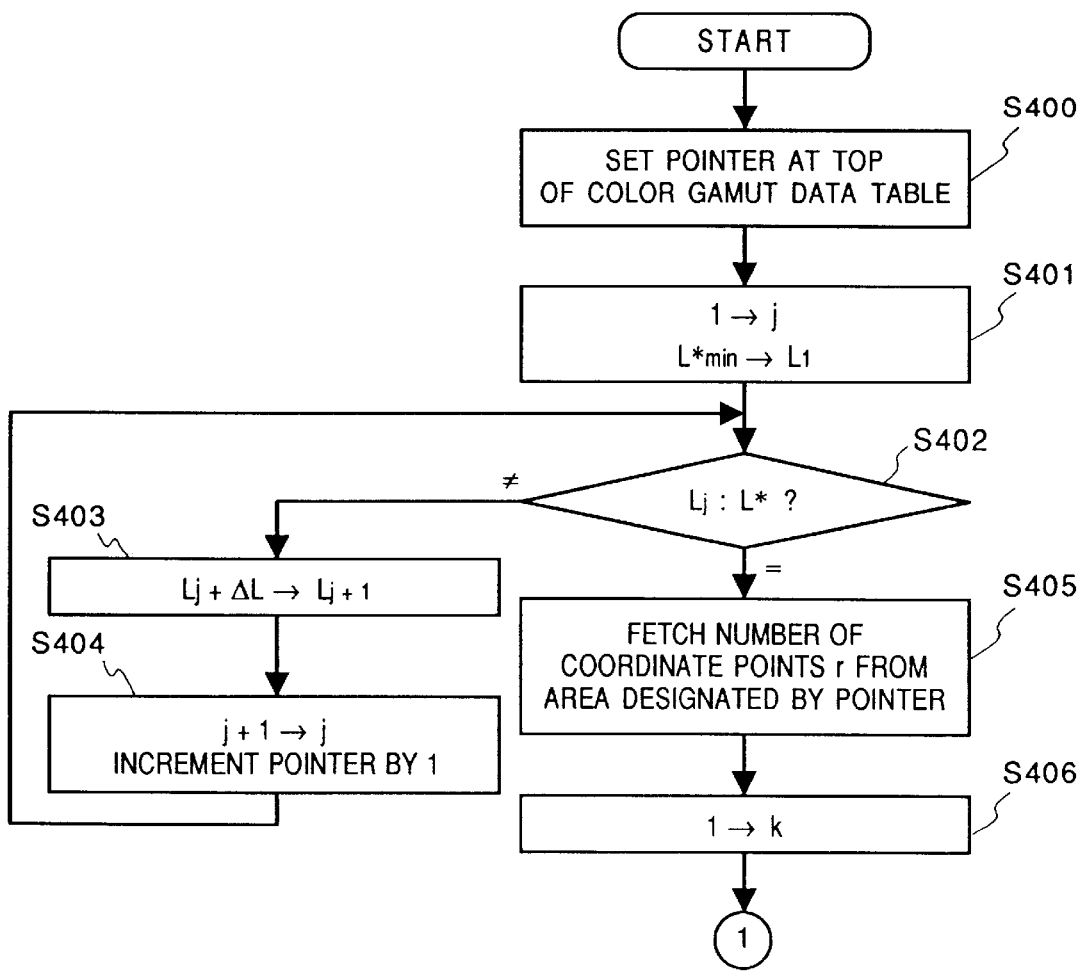
FIG. 29 is a flowchart of checking the color gamut on the basis of the color gamut data table shown in FIG. 28 according to the fourth embodiment.
Figure 30:
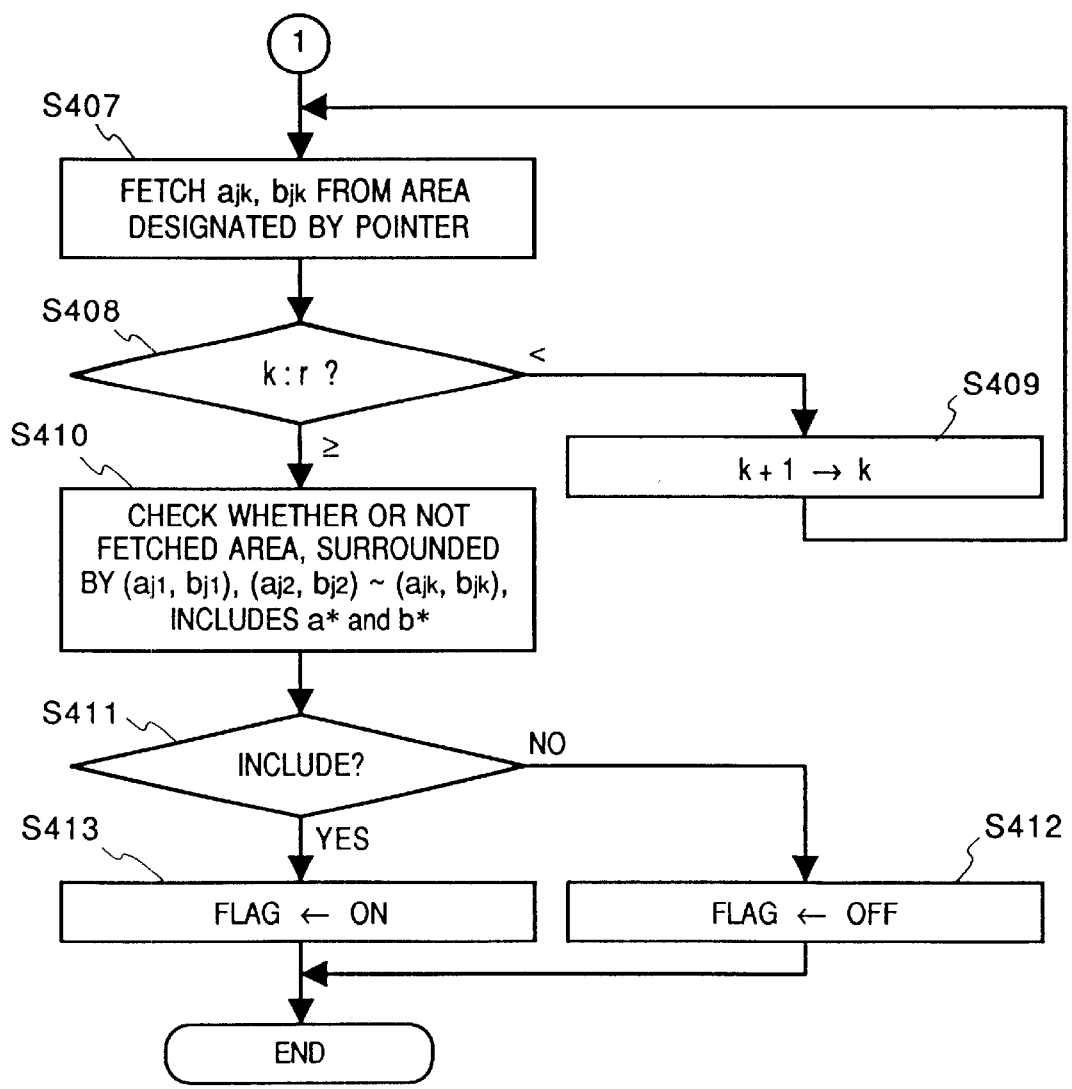
FIG. 30 is a flowchart of checking the color gamut on the basis of the color gamut data table shown in FIG. 28 according to the fourth embodiment.

FIGS. 29 and 30 are flowcharts of checking the color gamut on the basis of the color gamut data table in FIG. 28 by the host computer 2, especially by the color reproduction check unit 28. The process of checking the color gamut in the fourth embodiment will be explained with reference to flowcharts in FIGS. 29 and 30 below.

In the fourth embodiment, first, a pointer is set at the top of the color gamut data table in FIG. 28 at step S400 in FIG. 29, and the process proceeds to step S401. At step S401, a constant j is set to 1 and $L^*_{min}$ is set to $L_1$, then the process moves to step S402. At step S402, the read value of L* is compared with $L_1$. If the values of L* and $L_1$ are not equal, the process moves to step S403, thereat $L_j + \Delta L$ is set to $L_{j+1}$, and the process proceeds to step S404. At step S404, j and the pointer are incremented by 1, and the process goes back to step S402.

Whereas, if L* and $L_1$ have the same value, the process proceeds to step S405, thereat a number of a coordinate point r is fetched from an area where the pointer designates, then the process moves to step S406. At step S406, a constant k is set to 1, then the process moves to step S407 in FIG. 30. At step S407, $a_{j\cdot k}$ and $b_{j\cdot k}$ are fetched from an area where the pointer designates and the process proceeds to step S408. Then k is compared with r at step S408. If r is larger than k, then the process proceeds to step S409, and after k is incremented by 1, the process goes back to step S407.

If it is determined at step S408 that r is not larger than k, the process proceeds to step S410, and whether or not a* and b* are included in a closed area surrounded by coordinate points, $(a_{j\cdot 1}, b_{j\cdot 1}), (a_{j\cdot 2}, b_{j\cdot 2}), \ldots, (a_{j\cdot k}, b_{j\cdot k})$, fetched at step S411 is checked. If not, the process proceeds to step S412, thereat a flag is set OFF, and the process is completed.

Whereas, if a* and b* are included in the closed area surrounded by coordinate points, $(a_{j\cdot 1}, b_{j\cdot 1}), (a_{j\cdot 2}, b_{j\cdot 2}), \ldots, (a_{j\cdot k}, b_{j\cdot k})$, fetched at step S411, the process proceeds to step S413, thereat the flag is set ON, and the process is completed.

As described above, in the fourth embodiment, the color gamut is easily checked by using the color gamut data table in FIG. 28.

According to each embodiment as described above, by using any one of the aforesaid methods, it is possible to realize a function of checking a color gamut easily in a color management system and the like. Accordingly, color reproduction quality can be improved as well as a time to check the color reproduction area and an image processing time can be shortened.

The present invention can be applied to a system constituted by a plurality of devices, or to an apparatus comprising a single device. Furthermore, the invention is applicable also to a case where the object of the invention is attained by supplying a program to a system or apparatus.

It should be noted that a color space representing a color gamut is not limited to the L* a* b* color space, and the standard RGB color space, such as NTSC, and the like can be used instead.

Further, if a value of $\Delta L^*$ is not the minimum, an adding method can be added to the aforesaid method of checking a color gamut.

Furthermore, the present invention is not limited to an apparatus which displays the checked result of a color gamut, and can be applicable to any kind of apparatus performing color reproduction on the basis of the checked result of the color gamut.

According to the present invention as described above, it is possible to provide an image processing method, in which a color reproduction device converts image data, that enables the device to reproduce a more faithful image to the input image.

Further, in a color management system and the like, a color gamut for realizing a color gamut checking function can be easily confirmed, thereby quality of determining color gamut can be improved as well as color reproduction processing time can be shortened.

The present invention is not limited to the above embodiments and various changes and modifications can be made within the spirit and scope of the present invention. Therefore to appraise the public of the scope of the present invention, the following claims are made.

What is claimed is:

1. A color image processing method for determining whether color image data has a value within or outside of a color gamut of a device, the method comprising:

a referring step of referring to a color gamut table for the device according to input color image data, the color gamut table containing a plurality of lattice data, with each of the plurality of lattice data having either a value indicating the color image data is within the color gamut, or a value indicating the color image data is outside the color gamut;

an interpolation step of performing interpolation upon the lattice data;

a determination step of determining whether the input color image data has a value within or outside of the color gamut of the device; and a notification step of notifying a user of a result of the determination in said determination step, wherein in said notification step, an input color image is displayed based on a result of a determination in said determination step.

2. A method according to claim 1, wherein data determined to be outside the color gamut is represented as a predetermined color in said notification step.

3. A color image processing method comprising:

a storing step of storing color gamut table for a device;

a determination step of determining whether color image data has a value within or outside of a color gamut of the device, by using the color gamut table, wherein the color gamut table contains a plurality of lattice data, each of the plurality of lattice data having either a value indicating the color image data is within the color gamut, or a different value indicating the color image data is outside the color gamut, and if it is determined in said determination step that the color image data is within the color gamut, a flag is turned on, and if it is determined in said determination step that the color image data is outside the color gamut, the flag is turned off; and a notification step of notifying a user of a result of a determination in said determination step, wherein in said notifying step, an input image is displayed based on the result of the determination in said determination step.

4. A method according to claim 3, wherein data determined to be outside the color gamut is represented as a predetermined color in said notification step.

5. A method according to claim 3, further comprising an interpolation step of processing data determined in said determination step to be outside the color gamut so as to provide interpolated data within the color gamut.

6. A color image processing apparatus for determining whether color image data has a value within or outside of a color gamut of a device, the apparatus comprising:

referring means for referring to a color gamut table for the device according to input color image data, the color gamut table containing a plurality of lattice data, with each of the plurality of lattice data having either a value indicating the color image data is within the color gamut, or a value indicating the color image data is outside the color gamut;

interpolation means for performing interpolation upon the lattice data;

determination means for determining whether the input color image data has a value within or outside of the color gamut of the device; and notification means for notifying a user of a result of the determination by said determination means and displaying an input color image based on the result of the determination by said determination means.

7. An apparatus according to claim 6, wherein said notification means is arranged to display an input image based on the result of the determination by said determination means.

8. An apparatus according to claim 6, wherein said notifying means comprises color-representation means for representing data determined by said determination means to be outside the color gamut as a predetermined color.

9. A color image processing apparatus comprising:

storage means for storing a color gamut table for a device;

determination means for determining whether color image data has a value within or outside of a color gamut of the device, by using the color gamut table, wherein the color gamut table contains a plurality of lattice data each of the plurality of lattice data having either a value indicating the color image data is within the color gamut, or a different value indicating the color image data is outside the color gamut, and if said determination means determines that the color image data is within the color gamut, said determination means turns a flag on, and if said determination means determines that the color image data is outside the color gamut, said determination means turns the flag off; and notification means for notifying a user of a result of a determination by said determination means.

10. An apparatus according to claim 9, wherein said notification means is arranged to display an input image based on the result of the determination by said determination means.

11. An apparatus according to claim 9, wherein said notification means comprises color-representation means for representing data determined by said determination means to be outside the color gamut as a predetermined color.

12. A computer program product comprising a computer usable medium having computer readable program code means embodied in said medium, said product including:

determination process procedure code means for determining whether color image data has a value within or outside of a color gamut of a device, by referring to a color gamut table for the device;

interpolation process procedure code means for performing interpolation in accordance with a determination in said determination process, wherein the color gamut table contains a plurality of lattice data, each of the plurality of lattice data having either a value indicating the color image data is within the color gamut, or a different value indicating the color image data is outside the color gamut; and notification process procedure code means for notifying a user of a result of the determination in said determination process.

13. A computer program product according to claim 12, wherein said notification process procedure code means is further for displaying an input image based on the result of the determination by said determination process.

14. A computer program product according to claim 12, wherein said notification process procedure code means comprises color-representation process procedure code means for representing data determined by said determination process to be outside the color gamut as a predetermined color.

15. A color image processing method comprising the steps of:

storing a color gamut table representing colors which can be reproduced by a color reproduction device arranged to produce a color reproduction of color image data input to the device;

determining whether a color can be reproduced by the color reproduction device by using the stored color gamut table, characterized by carrying out the storing step by storing the color gamut table so that each address within the table is associated with a respective different color of the color input image data, the data stored at each address having either a first value indicating that the associated color falls within the color gamut or a second value indicating that the associated color falls outside the color gamut, and carrying out the determining step by using the color image data to be input to the color reproduction device to address the color gamut table to determine whether the first or second value is stored at the address corresponding to that color so as to determine whether or not the color represented by the color data falls within the color gamut of the color reproduction device; and notifying a user of a result of a determination in said determination step, wherein in said notifying step, an input image is displayed based on the result of the determination in said determination step.

16. A method according to claim 15, wherein data determined to be outside the color gamut is represented as a predetermined color in said notification step.

17. A method according to claim 15, further comprising an interpolation step of processing data determined in said determination step to be outside the color gamut so as to provide interpolated data within the color gamut.

18. A color image processing apparatus comprising:

storage means for storing a color gamut table representing colors which can be reproduced by a color reproduction device arranged to produce a color reproduction of color image data input to the device;

determination means for determining whether a color can be reproduced by the color reproduction device by using the stored color gamut table, characterized in that each address within the color gamut table is associated with a respective different color of the color input image data, the data stored at each address having either a first value indicating that the associated color falls within the color gamut or a second value indicating that the associated color falls outside the color gamut, and in that the determination means is arranged to determine whether a color can be reproduced by the color reproduction device, to address the color gamut table to determine whether the first or second value is stored at the address corresponding to that color so as to determine whether or not the color represented by the color data falls within the color gamut of the color reproduction device; and notification means for notifying a user of a result of a determination by said determination means.

19. An apparatus according to claim 18, wherein said notification means is arranged to display an input image based on the result of the determination by said determination means.

20. An apparatus according to claim 18, wherein said notifying means comprises color-representation means for representing data determined by said determination means to be outside the color gamut as a predetermined color.

* * * * *

UNITED STATES PATENT AND TRADEMARK OFFICE
CERTIFICATE OF CORRECTION

PATENT NO. : 6,377,355 B1
DATED : April 23, 2002
INVENTOR(S) : Kumada

It is certified that error appears in the above-identified patent and that said Letters Patent is hereby corrected as shown below:

<u>Title page,</u>
Item [57], ABSTRACT,
Lines 2 and 8, "three dimensional" should read -- three-dimensional --;
Line 11, "two dimensional" (both occurrences) should read -- two-dimensional --; and
Line 12, "two dimensional" should read -- two-dimensional --.

<u>DRAWINGS,</u>
Sheet 1, Figure 1, "FLAME" should read -- FRAME --.

<u>Column 1,</u>
Line 18, "different" should read -- different from --;
Line 19, "denotes" should read -- denote --;
Line 27, "above-said" should read -- aforesaid --.

<u>Column 2,</u>
Line 12, "a" (both occurrences) should be deleted; and
Line 31, "ona" should read -- on a --.

<u>Column 3,</u>
Line 10, "(look up" should read -- (look-up --;
Line 13, "one of a cubic" should read -- a cube --; and
Line 32, "date" should read -- data --.

<u>Column 4,</u>
Line 48, "compression;" should read -- compression; and --.

<u>Column 5,</u>
Line 28, "process" should read -- processes --;
Line 49, "aforesaid" should read -- the aforesaid --; and
Line 67, "step S1," should read -- step S11, --.

<u>Column 6,</u>
Line 45, "FIG. 33D" should read -- FIG. 33D, --; and
Line 55, "(look up" should read -- (look-up --.

UNITED STATES PATENT AND TRADEMARK OFFICE
CERTIFICATE OF CORRECTION

PATENT NO. : 6,377,355 B1
DATED : April 23, 2002
INVENTOR(S) : Kumada

It is certified that error appears in the above-identified patent and that said Letters Patent is hereby corrected as shown below:

Column 7,
Line 8, "the" should be deleted;
Line 13, "$U(x_i+xf,$" should read -- $U(x_i+x_j,$ --;
Line 16, "$+U(xi,$" should read -- $+U(x_i,$ --;
Line 17, "$+U(xi+1,$" should read -- $+U(x_i+1,$ --; and
Line 19, "$U(x_i+1, y_i+1, z_i)$" should read -- $U(x_i+1, y_i+1, z_i+1)$ --.

Column 8,
Line 43, "printer 1" should read -- monitor 1 -- and "monitor 3," should read
-- printer 3, --; and
Line 56, "Therefore a," should read -- Therefore, a --.

Column 9,
Line 19, "L1" should read -- $L_1$ --;
Line 51, "the each" should read -- each --; and
Line 58, "the each" should read -- each --.

Column 10,
Line 33, "ranges" should read -- range --;
Line 35, "b*min and b*max" should read -- $b*_{min}$ and $b*_{max}$ --;
Line 48, "in a" should read -- in an --;
Line 50, "in correspond" should read -- $i_n$ correspond --; and
Line 55, "of a" should read -- of an --.

Column 11,
Line 22, "S211." should read -- step S211 --;
Lines 40, 41 and 44, "in" should read -- $i_n$ --;
Line 50, "gamuts." should read -- gamut. --; and
Line 63, "corresponding" should read -- corresponding to --.

Column 12,
Line 20, "is not" should read -- are not --.

UNITED STATES PATENT AND TRADEMARK OFFICE
CERTIFICATE OF CORRECTION

PATENT NO. : 6,377,355 B1
DATED : April 23, 2002
INVENTOR(S) : Kumada

It is certified that error appears in the above-identified patent and that said Letters Patent is hereby corrected as shown below:

Column 13,
Line 1, "$i_1, i_2, i_n$ is as" should read -- $i_1, i_2, \ldots i_n$ is the -- ; and
Line 2, "is corresponding" should read -- corresponds to --.

Column 14,
Line 17, "appraise" should read -- apprise --; and
Line 45, "color" should read -- a color --.

Column 15,
Line 29, "notifying" should read -- notification --.

Column 18,
Line 6, "notifying" should read -- notification --.

Signed and Sealed this

Twenty-fourth Day of June, 2003

JAMES E. ROGAN
*Director of the United States Patent and Trademark Office*